(12) United States Patent
Akabori et al.

(10) Patent No.: US 12,532,093 B2
(45) Date of Patent: Jan. 20, 2026

(54) SIGNAL PROCESSING METHOD, SIGNAL PROCESSING CIRCUIT, PHOTOELECTRIC CONVERSION APPARATUS, AND EQUIPMENT

(71) Applicant: CANON KABUSHIKI KAISHA, Tokyo (JP)

(72) Inventors: Hiroo Akabori, Kanagawa (JP); Takanori Yamashita, Tokyo (JP); Kazuo Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 18/757,199

(22) Filed: Jun. 27, 2024

(65) Prior Publication Data

US 2025/0008243 A1  Jan. 2, 2025

(30) Foreign Application Priority Data

Jun. 29, 2023  (JP) .................................. 2023-106780

(51) Int. Cl.
| | | |
|---|---|---|
| *H04N 25/78* | (2023.01) | |
| *H03M 1/56* | (2006.01) | |
| *H04N 25/77* | (2023.01) | |

(52) U.S. Cl.
CPC .............. *H04N 25/78* (2023.01); *H03M 1/56* (2013.01); *H04N 25/77* (2023.01)

(58) Field of Classification Search
CPC ......... H04N 25/78; H04N 25/77; H03M 1/56; H03M 1/123
See application file for complete search history.

(56) References Cited

U.S. PATENT DOCUMENTS

| | | | |
|---|---|---|---|
| 9,615,044 B2* | 4/2017 | Hashimoto | ........ H04N 25/7795 |
| 2011/0013050 A1* | 1/2011 | Aruga | .................... H04N 25/78 348/E5.079 |
| 2015/0042856 A1 | 2/2015 | Nakamura | |
| 2015/0181146 A1* | 6/2015 | Hashimoto | ............ H04N 25/77 341/158 |
| 2016/0286152 A1* | 9/2016 | Kobayashi | ............ H03M 1/129 |
| 2020/0275037 A1* | 8/2020 | Fukuhara | ............... H03M 1/182 |
| 2021/0258524 A1* | 8/2021 | Wakashima | ......... H04N 23/667 |
| 2024/0089631 A1* | 3/2024 | Takayanagi | .......... H04N 25/772 |

FOREIGN PATENT DOCUMENTS

| | | |
|---|---|---|
| JP | 2011023900 A | 2/2011 |
| JP | 2015037206 A | 2/2015 |
| JP | 2015126241 A | 7/2015 |
| JP | 2020137102 A | 8/2020 |

* cited by examiner

*Primary Examiner* — Nhan T Tran
(74) *Attorney, Agent, or Firm* — Canon U.S.A., Inc. IP Division

(57) ABSTRACT

A signal processing method for converting analog signals to digital signals of different bit numbers using a sloped ramp signal includes first A/D conversion for converting an analog signal to a digital signal of a first bit number using a first ramp signal with a first slope or converting the analog signal to the digital signal of the first bit number using a second ramp signal with a second slope, and second A/D conversion for converting an analog signal to a digital signal of a second bit number using a third ramp signal with a third slope or converting the analog signal to the digital signal of the second bit number using a fourth ramp signal with a fourth slope, wherein a ratio of the second slope to the first slope is lower than a ratio of the fourth slope to the third slope.

21 Claims, 14 Drawing Sheets

SIGNAL PROCESSING METHOD, SIGNAL PROCESSING CIRCUIT, PHOTOELECTRIC CONVERSION APPARATUS, AND EQUIPMENT

BACKGROUND

Field

The present disclosure relates to a signal processing method, a signal processing circuit, a photoelectric conversion apparatus, and equipment.

Description of the Related Art

Japanese Patent Laid-Open No. 2015-126241 discloses an analog-to-digital (A/D) converter that converts pixel signals output from pixels to digital signals. The A/D converter disclosed in Japanese Patent Laid-Open No. 2015-126241 achieves a high dynamic range and high-speed drive using a ramp signal with different slopes (a voltage change per unit time).

However, the A/D converter disclosed in Japanese Patent Laid-Open No. 2015-126241 may generate noise due to a quantization error.

SUMMARY

Various embodiments of the present disclosure provides signal processing techniques and mechanisms capable of reducing noise in A/D conversion using a ramp signal with different slopes.

According to one embodiment of the present disclosure, a signal processing method for analog-to-digital (A/D) conversion for converting analog signals to digital signals of different bit numbers using a sloped ramp signal is provided. The method includes first A/D conversion that performs at least one of an operation for converting an analog signal to a digital signal of a first bit number using a first ramp signal with a first slope or an operation for converting the analog signal to the digital signal of the first bit number using a second ramp signal with a second slope larger than the first slope, and second A/D conversion that performs at least one of an operation for converting an analog signal to a digital signal of a second bit number smaller than the first bit number using a third ramp signal with a third slope or an operation for converting the analog signal to the digital signal of the second bit number using a fourth ramp signal with a fourth slope larger than the third slope, wherein a ratio of the second slope to the first slope is lower than a ratio of the fourth slope to the third slope.

Further features of the present disclosure will become apparent from the following description of exemplary embodiments with reference to the attached drawings.

DESCRIPTION OF THE EMBODIMENTS

Some embodiments will be described hereinbelow with reference to the drawings. The following embodiments are not intended to limit the invention according to the claims. The embodiments describe a plurality of features, but not all of the features are required for every embodiment of the present disclosure. The features may be freely combined. In the attached drawings, the same or similar components are given the same reference signs, and duplicated descriptions will be omitted. The embodiments mainly describe sensors for image capturing as examples of the photoelectric conversion apparatus. The embodiments are applicable not only to the sensors for image capturing but also to other examples of the photoelectric conversion apparatus. Examples include image capturing apparatuses, distance measuring apparatuses (apparatuses for measuring distance using focus detection or Time Of Flight (TOF)), and photometric apparatuses (apparatuses for measuring the amount of incident light).

In the following description, the electric charges accumulated by the photoelectric converters in the pixels are electrons. All of the transistors of the pixels are N-channel metal-oxide-semiconductor (MOS) transistors (hereinafter abbreviated to NMOS transistors). Alternatively, the electric charges accumulated by the photoelectric converter may be holes. In this case, the transistors of the pixels may be P-channel MOS transistors (hereinafter abbreviated to PMOS transistors). In other words, the conductivity type of the transistors and so on can be changed as appropriate depending on the polarity of the electric charges treated as signals.

First Embodiment

A signal processing method according to a first embodiment of the present disclosure will be described with reference to FIGS. 1 to 3.

Figure 1:
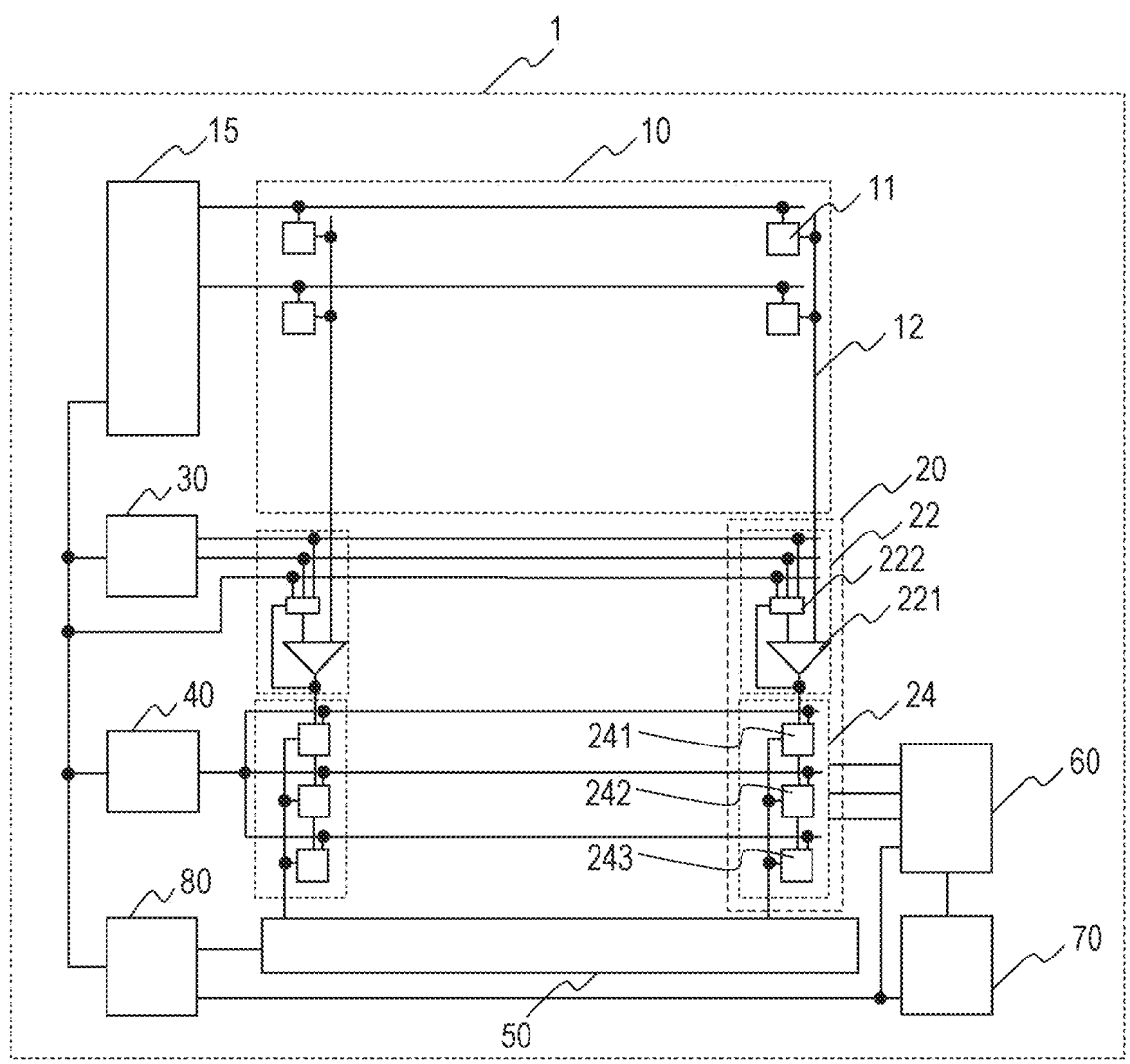
FIG. 1 is a block diagram illustrating a photoelectric conversion apparatus according to a first embodiment.

FIG. 1 is an example of a block diagram of an apparatus that performs a signal processing method according to this embodiment. The apparatus that performs the signal processing method is, for example, a photoelectric conversion apparatus, such as a complementary metal-oxide semiconductor (CMOS) image sensor. This specification will be described using the photoelectric conversion apparatus.

As illustrated in FIG. 1, a photoelectric conversion apparatus 1 includes a pixel array section 10, a signal line 12, a row selection circuit 15, a column-signal processing circuit 20, a reference-signal output circuit 30, a counter circuit 40, and a column selection circuit 50. The photoelectric conversion apparatus 1 further includes a digital signal processor (DSP) 60, an output circuit 70, and a timing generating circuit (controller) 80. In this specification, the signal processing circuit includes at least the column-signal processing circuit 20 and the timing generating circuit (controller) 80.

The pixel array section 10 includes multiple pixels 11 in rows and columns. The pixels 11 generate pixel signals by photoelectric conversion. A signal line 12 and a column-signal processing circuit 20 are provided for each column of the pixels 11. The column-signal processing circuit 20 includes an analog to digital (A/D) conversion circuit 22 and a memory circuit 24. The A/D conversion circuit 22 includes a comparator 221 and a selection circuit 222. A pixel signal output from each pixel 11 is input to one input terminal of the comparator 221 of a corresponding column-signal processing circuit 20 through a corresponding signal line 12. The reference-signal output circuit 30 outputs a ramp signal VRAMP, which changes in voltage with time. The output ramp signal VRAMP is input to the other input terminal of the comparator 221 via the selection circuit 222. The A/D conversion circuit 22 converts the pixel signal, which is an analog signal, to a digital signal using the ramp signal VRAMP and outputs the digital signal.

The ramp signal VRAMP may be generated by the reference-signal output circuit 30 or a circuit different from the reference-signal output circuit 30. The ramp signal VRAMP used in this embodiment has a fixed slope (a fixed voltage change per unit time) but may have a changing slope. The changing slope of the ramp signal VRAMP includes a stepwise slope. The reference-signal output circuit 30 is capable of outputting multiple ramp signals VRAMP with different slopes. The selection circuit 222 selects one of the multiple ramp signals VRAMP.

The counter circuit 40 outputs a count signal CNT for use in A/D conversion performed by the column-signal processing circuit 20. The count signal CNT is a signal that counts clock pulse signals CLK supplied from a clock pulse supply circuit (not shown) from the time the ramp signal VRAMP output from the reference-signal output circuit 30 begins to change with time. The counter circuit 40 illustrated in FIG. 1 is shared by the column-signal processing circuits 20 but may be provided for each of the column-signal processing circuits 20.

The memory circuit 24 includes a flag memory 241, an S memory 242, and an N memory 243. The comparator 221 outputs a comparison result signal that represents the result of comparison between the pixel signal input through the signal line 12 and the ramp signal VRAMP to the memory circuit 24. Specifically, when the voltage of the ramp signal VRAMP is higher than the voltage of the pixel signal (the amplitude of the ramp signal VRAMP is smaller than the amplitude of the pixel signal), the comparator 221 outputs a low-level signal. When the voltage of the ramp signal VRAMP is lower than the voltage of the pixel signal (the amplitude of the ramp signal VRAMP is larger than the amplitude of the pixel signal), the comparator 221 outputs a high-level signal. The signal amplitude is a difference in voltage from a reference voltage. The reference voltage is regarded as the voltage of a reset level signal (described later) output from the pixel 11. In another perspective, the reference voltage is regarded as a power-supply voltage supplied to an amplifying transistor 430 (described below) of the pixel 11. The relationship between the high level and the low level is illustrative only and may be opposite. The memory circuit 24 stores the count signal CNT output from the counter circuit 40 based on a change in signal level of the comparison result signal output from the comparator 221. Thus, the memory circuit 24 stores the count signal CNT with a signal value corresponding to the value of the pixel signal as a digital signal corresponding to the pixel signal, and the pixel signal output from the pixel 11 is converted from analog to digital.

The N memory 243 stores a digital signal obtained by converting a reset-level signal (hereinafter, referred to as an N signal) of a floating diffusion (FD) section 420 (described below) from analog to digital. This digital signal includes variations in characteristics of each column-signal processing circuit 20. The S memory 242 stores a digital signal obtained by A/D converting a signal (a photoelectric conversion signal) of a photoelectric converter 400 (described below) superimposed on the N signal of the FD section 420. The flag memory 241 stores the result of comparison between a threshold voltage output from the reference-signal output circuit 30 and the pixel signal by the comparator 221 (hereinafter, referred to as a J signal). The J signal is also input to the selection circuit 222. In this embodiment, the signal of the threshold voltage output from the reference-signal output circuit 30 changes in voltage with time but may be fixed with respect to time. The constant signal with no voltage change may be generated and output from a circuit separate from the reference-signal output circuit 30.

The column selection circuit 50 selects the memory circuit 24. The signals stored in the memory circuit 24 are transferred to the DSP 60 in sequence in response to horizontal scanning signals output from the column selection circuit 50. The row selection circuit 15 selects predetermined rows in sequence. The DSP 60 corrects the obtained signals. For example, the DSP 60 outputs a signal obtained by subtracting a digitized N signal from a digitized S signal and reducing a noise component. The output circuit 70 outputs the signal output from the DSP 60 outside the photoelectric conversion apparatus 1. The output circuit 70 may have a buffer function. The timing generating circuit 80 supplies driving signals to the row selection circuit 15, the column-signal processing circuit 20, the reference-signal output circuit 30, the counter circuit 40, and the column selection circuit 50.

Figure 2:
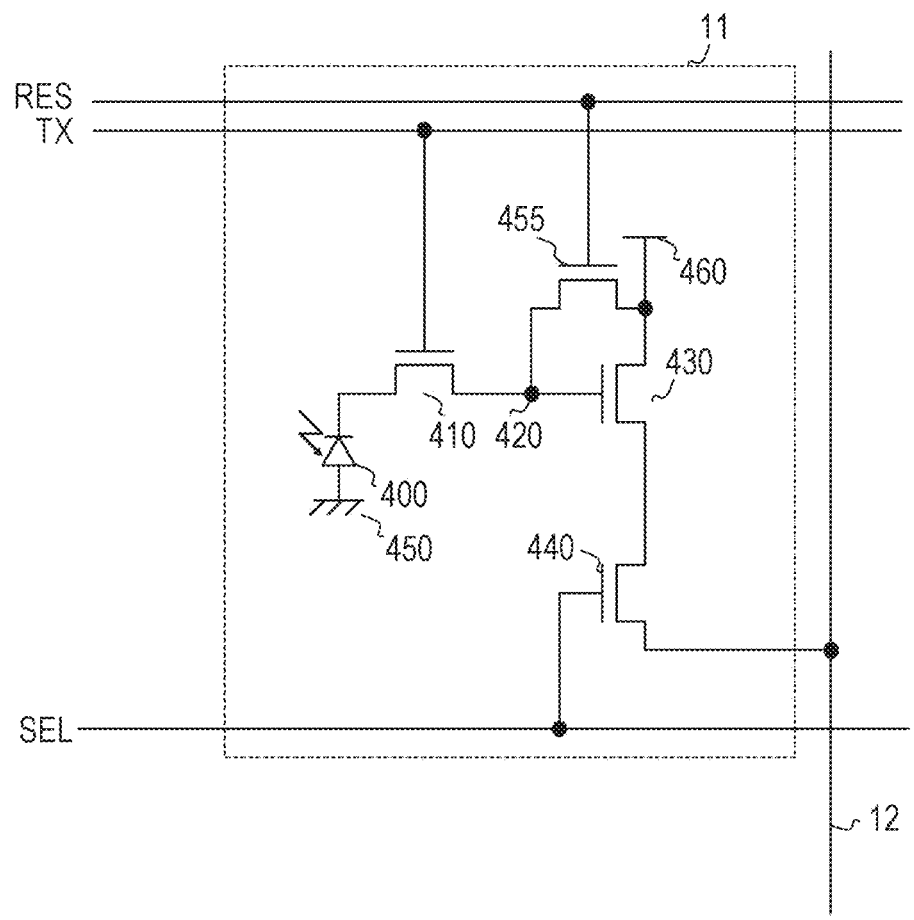
FIG. 2 is a circuit diagram illustrating a pixel according to the first embodiment.

FIG. 2 is an example of a circuit diagram of the pixel 11 of the photoelectric conversion apparatus 1 that performs the signal processing method according to this embodiment.

As illustrated in FIG. 2, the pixel 11 includes a photoelectric converter 400, a transfer transistor 410, and the floating diffusion section 420. In this specification, the floating diffusion section 420 is sometimes referred to as "FD section 420". The pixel 11 further includes a reset transistor 455 for resetting the FD section 420, an amplifying transistor 430 for amplifying signals, and a selection transistor 440. The photoelectric converter 400 is electrically connected to a ground voltage node 450. The reset transistor 455 and the amplifying transistor 430 are electrically connected to a power-supply voltage node 460 so that a power-supply voltage is supplied. The selection transistor 440 is omitted in some embodiments. The transfer transistor 410, the reset transistor 455, the amplifying transistor 430, and the selection transistor 440 may be N-type MOS transistors or P-type MOS transistors.

One example of the photoelectric converter 400 is a photodiode. The photoelectric converter 400 is not limited to the photodiode but may be a photoelectric conversion film. The photoelectric converter 400 receives light incident on the pixel 11 and generates an electric charge corresponding to the incident light. The reset transistor 455 is driven by a control signal RES. The FD section 420 is reset to a voltage based on the power-supply voltage by turning on the reset transistor 455. The reset of the FD section 420 is released by turning off the reset transistor 455.

The transfer transistor 410 is driven by a control signal TX. The electric charge generated by the photoelectric converter 400 is transferred to the FD section 420 by turning on the transfer transistor 410.

The FD section 420 functions as an electric-charge-voltage converting section that temporarily stores the electric charge input from the photoelectric converter 400 and converts the stored electric charge to a voltage signal. The amplifying transistor 430 amplifies the pixel signal converted by the FD section 420. The selection transistor 440 is driven by a control signal SEL and connects the amplifying transistor 430 to the signal line 12 to output the pixel signal amplified by the amplifying transistor 430 to the signal line 12. Various embodiments of the present disclosure are applicable to both front-illuminated and back-illuminated sensors.

The configuration of the pixel 11 illustrated in FIG. 2 is illustrative only and may further include another transistor. For example, the pixel 11 may further include a transistor that changes the capacitance value of the FD section 420 and a transistor that discharges electric charge from the photoelectric converter 400. The selection transistor 440 may be omitted, and selection/unselection of the pixel 11 may be changed depending on the voltage input from the reset transistor 455 to the FD section 420.

Figure 3:
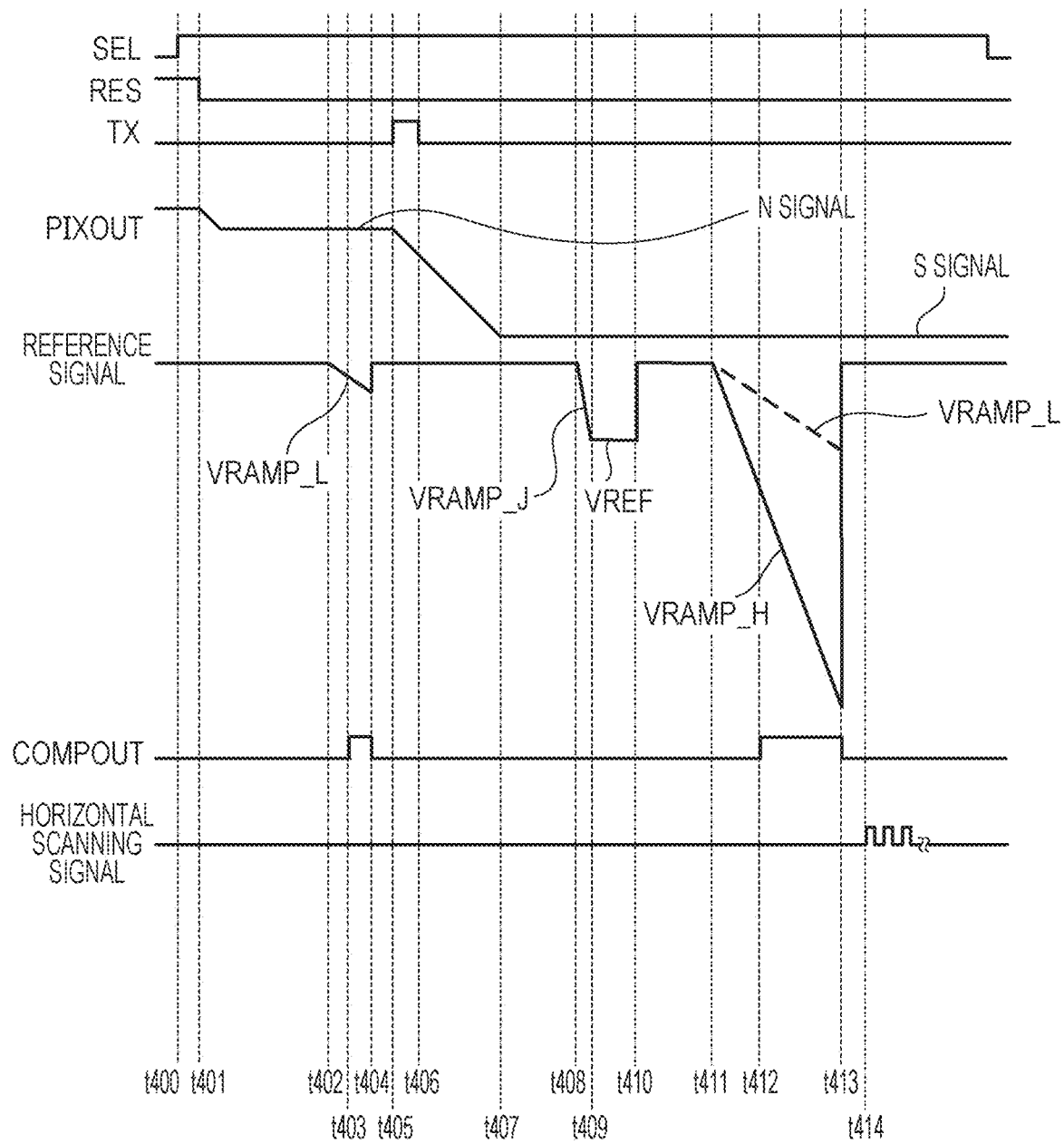
FIG. 3 is a drive timing chart illustrating a signal processing method according to the first embodiment.

FIG. 3 is an example of a drive timing chart of the photoelectric conversion apparatus 1 that performs the signal processing method according to this embodiment.

FIG. 3 shows time on the horizontal axis and voltage on the vertical axis, schematically illustrating the timing of the driving pulses, the pixel signal, and the reference signal. The individual control signals shown in FIG. 3 correspond to the control signals illustrated in FIG. 2. The period from time t408 to time t410 when the slope of the ramp signal VRAMP for use in A/D conversion is referred to as a first step. The period from time t411 to time t413 when A/D conversion of the S signal is performed is referred to as a second step, and the period from time t402 to time t404 when A/D conversion of the N signal is performed is referred to as a third step. The operation of transferring electric charge from the photoelectric converter 400 of the pixel 11 is performed at multiple timings, and the first step and the second step are each performed between two consecutive timings of the multiple timings. In addition to the first step and the second step, the third step may be performed between two consecutive timings of the multiple timings. The operation of transferring electric charge from the photoelectric converter 400 of the pixel 11 is performed at multiple timings, including, for example, once in each of multiple frames. The operation of transferring electric charge from the photoelectric converter of the pixel 11 is performed at multiple timings, including, for example, multiple times in one frame.

At time t400, the row selection circuit 15 raises the control signal SEL to a high level to select the row of the pixel 11 that outputs a pixel signal PIXOUT. The row selection circuit 15 raises the control signal RES to a high level to reset the voltage of the FD section 420. At time t401, the row selection circuit 15 lowers the control signal RES to a low level. The pixel signal PIXOUT that is output when the control signal RES is lowered to a low level is the N signal. The N signal mainly contains the noise component of the pixel 11.

The voltage of a ramp signal VRAMP_L is decreased from the initial value with time by the reference-signal output circuit 30 during the period from time t402 to time t404. The reference-signal output circuit 30 can output multiple ramp signals VRAMP with different slopes in parallel to the column-signal processing circuit 20. The multiple ramp signals VRAMP with different slopes include a ramp signal VRAMP_L with a small slope, a ramp signal VRAMP_H with a large slope, and a ramp signal VRAMP_J with an even larger slope. In FIG. 3, for example, the ramp signal VRAMP_L is input to the comparator 221 via the selection circuit 222. Using the ramp signal VRAMP_L as a reference signal allows high-resolution A/D conversion because a voltage change per unit time is smaller than using the ramp signal VRAMP_H. Thus, the analog pixel signal PIXOUT is converted to a digital signal during the period from time t402 to time t404 based on the result of comparison between the pixel signal PIXOUT and the ramp signal VRAMP_L. The above driving is performed by transmitting a control signal from the timing generating circuit 80 to the reference-signal output circuit 30 and the selection circuit 222.

Upon the start of the voltage change of the ramp signal VRAMP_L at time t402, the counter circuit 40 starts to count the clock pulse signals and supplies the count signal CNT to the N memory 243 of each column. At time t403, the voltage of the ramp signal VRAMP_L falls below the pixel signal PIXOUT, and the signal value of a comparator output COMPOUT output from the comparator 221 changes. The value of the count signal CNT (count value) at that time is stored in the N memory 243. The value of the count signal CNT stored in the N memory 243 at that time is the A/D converted digital value of the N signal. At time t404, the time-dependent voltage change of the ramp signal VRAMP_L is stopped, and the voltage is reset to the state at time t400. The counter circuit 40 counts the clock pulse signals and returns the count signal CNT to the initial value.

At time t405, the control signal TX is raised to a high level, and at time t406, the control signal TX is lowered to a low level. This causes the electric charge generated by the light incident on the photoelectric converter 400 is transferred to the FD section 420. The amplifying transistor 430 outputs a voltage signal based on the electric charge transferred to the FD section 420. This voltage signal is output to the signal line 12 via the selection transistor 440, and the pixel signal is input to one input terminal of the comparator 221. This signal is the S signal, which is part of the pixel signal PIXOUT. The S signal is an analog signal with a voltage corresponding to the amount of light received by the photoelectric converter 400 during one frame period.

The voltage of the ramp signal VRAMP_J is decreased with time from the initial value by the reference-signal output circuit 30 during the period from time t408 to time t409. At time t409, the voltage change of the ramp signal VRAMP_J is stopped. The voltage of the ramp signal VRAMP_J reaches a threshold voltage VREF at time t409. The threshold voltage VREF is used as the threshold for determining whether to select the ramp signal VRAMP_L or VRAMP_H as a ramp signal for converting the pixel signal PIXOUT from analog to digital. The value of the threshold voltage VREF is smaller than the final voltage value (minimum value) of the ramp signal VRAMP_L.

During the period from time t409 to time t410, the comparator 221 compares the threshold voltage VREF and the pixel signal PIXOUT. If the voltage of the pixel signal PIXOUT is higher than the threshold voltage VREF (the amplitude of the pixel signal PIXOUT is smaller than that of the threshold voltage VREF), the comparator output COMPOUT (J signal) rises from a low level to a high level (=1). The comparator output COMPOUT based on the result of comparison between the threshold voltage VREF and the pixel signal PIXOUT is input to the selection circuit 222. The selection circuit 222 selects the ramp signal VRAMP_L and inputs the ramp signal VRAMP_L to the comparator 221. If the voltage of the pixel signal PIXOUT is higher than the threshold voltage VREF, the ramp signal VRAMP_L with a small slope is used in A/D conversion. In other words, at the second step, the ramp signal VRAMP_L is used based on the comparison result at the first step.

If the voltage of the pixel signal PIXOUT is lower than the threshold voltage VREF (the amplitude of the pixel signal PIXOUT is larger than that of the threshold voltage VREF), the comparator output COMPOUT (J signal) is kept at the low level (=0). The comparator output COMPOUT based on the result of comparison between the threshold voltage VREF and the pixel signal PIXOUT is input to the selection circuit 222. The selection circuit 222 selects the ramp signal VRAMP_H and inputs it to the comparator 221. If the voltage of the pixel signal PIXOUT is lower than (the signal amplitude is larger than) the threshold voltage VREF, the ramp signal VRAMP_H with a slope larger than that of the ramp signal VRAMP_L is used for A/D conversion. In other words, at the second step, the ramp signal VRAMP_H is used based on the comparison result at the first step.

The above driving method allows A/D conversion at suitable resolution according to the output level of the pixel signal PIXOUT. In other words, a high dynamic range and high-speed driving can be achieved. FIG. 3 illustrates a case in which the voltage of the pixel signal PIXOUT is lower than the threshold voltage VREF, and the ramp signal VRAMP_H is used at the second step.

During the period from time t409 to time t410, the value of the comparator output COMPOUT (J signal) is input to the selection circuit 222. The J signal is also stored in the flag memory 241.

At time t410, the determination of which signal, the ramp signal VRAMP_H or the VRAMP_L, to use during the A/D conversion period of the S signal is completed, and the voltage of the ramp signal VRAMP_J is reset.

During the period from time t411 to time t413, the voltage of the ramp signal VRAMP_L or the ramp signal VRAMP_H is decreased with time from the initial value by the reference-signal output circuit 30. The pixel signal PIXOUT is compared with the ramp signal VRAMP_L or the ramp signal VRAMP_H. The pixel signal PIXOUT is converted to a digital signal on the basis of the comparison result. Which of the ramp signal VRAMP_L and VRAMP_H is input to the comparator 221 by the column-signal processing circuit 20 depends on the value of the comparator output COMPOUT (J signal) during the period from time t409 to time t410. In the case of FIG. 3, if the voltage of the pixel signal PIXOUT during the period from time t409 to time t410 is lower than the threshold voltage VREF, the ramp signal VRAMP_H with a large slope is selected.

Upon the start of the voltage change of the ramp signal VRAMP_L or the ramp signal VRAMP_H at time t411, the counter circuit 40 starts to count the clock pulse signals and supplies the count signal CNT to the S memory 242 of each column.

At time t412, the voltage of the ramp signal VRAMP_L or the ramp signal VRAMP_H exceeds the pixel signal PIXOUT, and the signal value of the comparator output COMPOUT changes. The value of the count signal CNT (count value) at that time is stored in the S memory 242. The value of the count signal CNT stored in the S memory 242 at that time is a digital value obtained by converting the S signal from analog.

At time t413, the time-dependent voltage change of the ramp signal VRAMP_L or the ramp signal VRAMP_H is stopped, and the voltage is reset to the state at time t400. The counter circuit 40 stops counting the clock pulse signals and returns the count signal CNT to the initial value.

From time t414 onward, the column-signal processing circuits 20 are operated in sequence in response to horizontal scanning signals output from the column selection circuit 50, and the signals stored in the flag memory 241, the S memory 242, and the N memory 243 are sent to the DSP 60. After calculation processing, the signals are output outside the photoelectric conversion apparatus 1.

At the DSP 60, a differential signal level (optic element) obtained by subtracting a digitized N signal from a digitized S signal is calculated.

Suppose that, at the second step, first A/D conversion to a digital signal of a first bit number and second A/D conversion to a digital signal of a second bit number less than the first bit number are performed in different frames. The ramp signal VRAMP_L used for the first A/D conversion is referred to as a first ramp signal with a first slope, and the ramp signal VRAMP_H used for the first A/D conversion is referred to as a second ramp signal with a second slope. The ramp signal VRAMP_L used for the second A/D conversion is referred to as a third ramp signal with a third slope, and the ramp signal VRAMP_H used for the second A/D conversion is referred to as a fourth ramp signal with a fourth slope. The ratio of the bit depth of the first A/D conversion to the bit depth of the second A/D conversion is substantially equal to the ratio of the fourth slope to the second slope. The final voltage value (minimum value) of the second ramp signal and the final voltage value (minimum value) of the fourth ramp signal may be substantially equal. The "substantially equal" includes a slight difference due to a manufacturing error, although the values are equal in design.

For example, when the ratio of the second slope to the first slope is equal to or higher than the ratio of the fourth slope to the third slope, the second A/D conversion can generate more noise than the first A/D conversion because of a quantization error. However, this embodiment sets the ratio of the second slope to the first slope smaller than the ratio of the fourth slope to the third slope, which decrease the influence of the quantization error of the second A/D conversion, thereby reducing noise.

Some equipment (for example, a camera) including a photoelectric conversion apparatus has multiple modes. Examples of the multiple modes include a still-image capturing mode and a moving-image capturing mode or a high-resolution mode and a low-resolution mode of the captured image. The signal processing circuit may also have multiple modes with different A/D conversion operations. The mode of the signal processing circuit may be changed according to the mode executed by the equipment. In other words, the signal processing circuit may have a first mode in which the second A/D conversion is not performed during the period of multiple first A/D conversions and a second mode in which the first A/D conversion is not performed during the period of multiple second A/D conversions. For example, when an obtained photoelectric conversion signal is used as an image capturing signal, A/D conversion that generates different bit numbers (bit depth) because the optimum resolution of A/D conversion differs for each image capturing purpose. For example, in the still-image capturing mode, high-resolution A/D conversion is performed to obtain digital signals for a still image, and in the moving-image capturing mode, low-resolution A/D conversion is performed to obtain digital signals for a moving image. For this reason, the first mode may be used for the still-image capturing mode, and the second mode may be used for the moving-image capturing mode. The multiple modes may include a live-view acquisition mode, in which even lower-resolution A/D conversion may be performed to acquire digital signals for live view.

To determine the ramp signal VRAMP for use in the first A/D conversion (second step), the threshold voltage VREF for use in the first step for the first A/D conversion is referred to as a first threshold voltage VREF1. To determine the ramp signal VRAMP for use in the second A/D conversion (second step), the threshold voltage VREF for use in the first step for the second A/D conversion is referred to as a second threshold voltage VREF2. The voltage (signal amplitude) of the second threshold voltage VREF2 may be lower than the voltage (signal amplitude) of the first threshold voltage VREF1.

The A/D conversion (third step) of the N signal, which is performed during the period from time t402 to time t404 in FIG. 3, may be performed as third A/D conversion before the first A/D conversion and the second A/D conversion. The third A/D conversion may use ramp signals with different slopes. For example, third A/D conversion corresponding to the first A/D conversion uses the first ramp signal or the second ramp signal, and third A/D conversion corresponding to the second A/D conversion uses the third ramp signal or the fourth ramp signal.

The ratio of the bit depth of the first A/D conversion to the bit depth of the second A/D conversion may be lower than the ratio of the fourth slope to the third slope.

In the first A/D conversion for the first bit number and the second A/D conversion for the second bit number, the result of the second A/D conversion may be extended to the first bit number with the DSP 60 to equalize the A/D conversion gains. This example is illustrative only. The output circuit 70 may output a digital signal with the second bit number unchanged to outside of the photoelectric conversion apparatus 1 without the DSP 60 performing the bit extension.

Thus, this embodiment can use ramp signals with different slopes and performs A/D conversion for converting analog signals to digital signals with different bit numbers. In this operation, the ratio of the slopes of ramp signals in A/D conversion for a small bit number is set higher than the ratio of the slopes of ramp signals in A/D conversion for a large bit number. Performing this signal processing method can reduce the effect of a quantization error in A/D conversion for a small bit number, thereby reducing the noise.

Second Embodiment

A photoelectric conversion apparatus according to a second embodiment of the present disclosure will be described with reference to FIGS. 4 and 5. The components corresponding to those in the first embodiment are denoted by the same reference signs, and descriptions thereof may be omitted or simplified.

This embodiment differs from the first embodiment in that A/D conversion is performed using ramp signals VRAMP with different slopes for one N signal. FIG. 4 is an example of a block diagram of the photoelectric conversion apparatus 1 that performs a signal processing method according to this embodiment.

Figure 4:
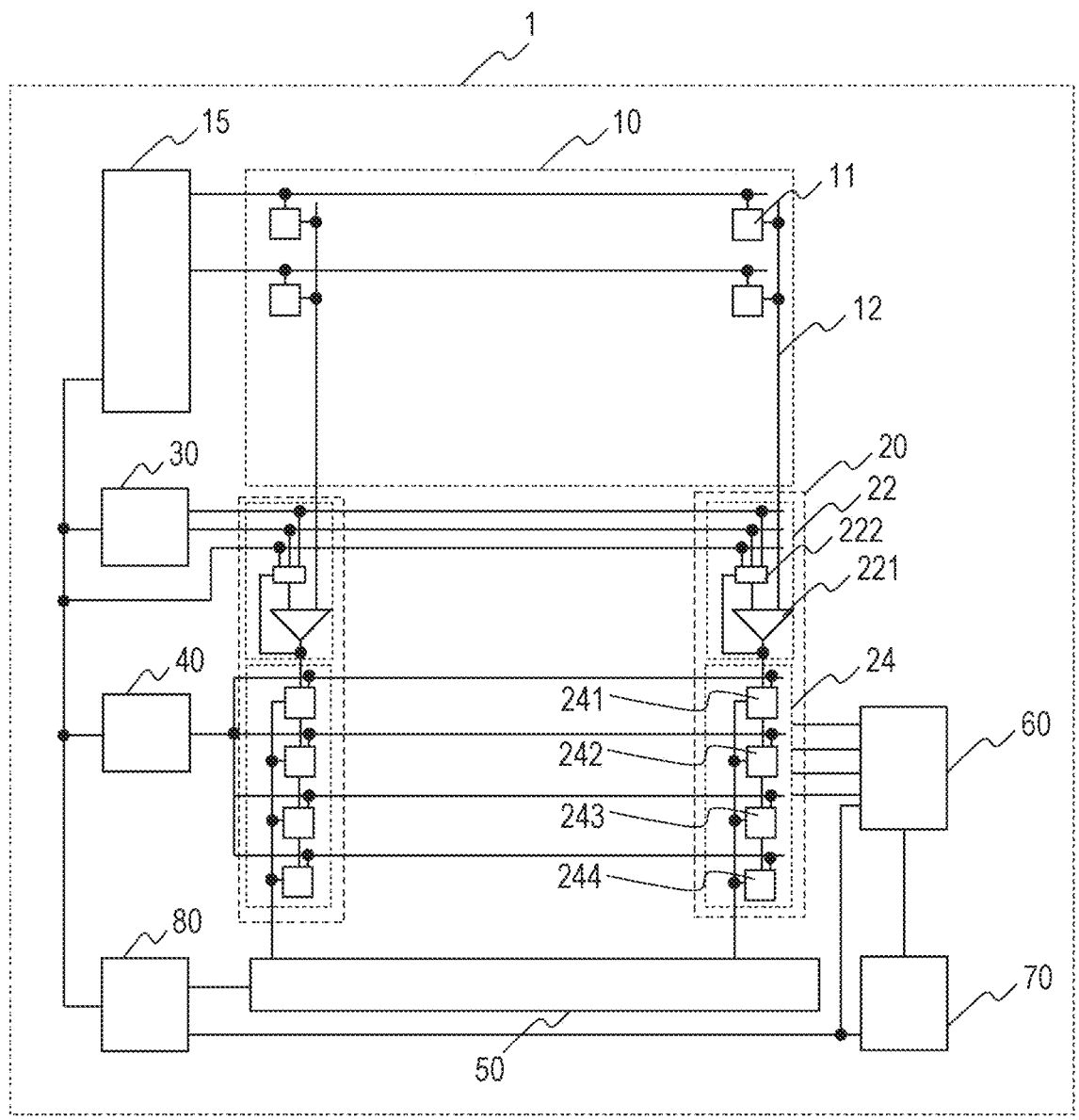
FIG. 4 is a block diagram illustrating a photoelectric conversion apparatus according to a second embodiment.

As illustrated in FIG. 4, the memory circuit 24 includes an N memory 244 in addition to the configuration in FIG. 1. Like the N memory 243, the N memory 244 stores a digital signal obtained by converting the N signal from analog to digital.

Figure 5:
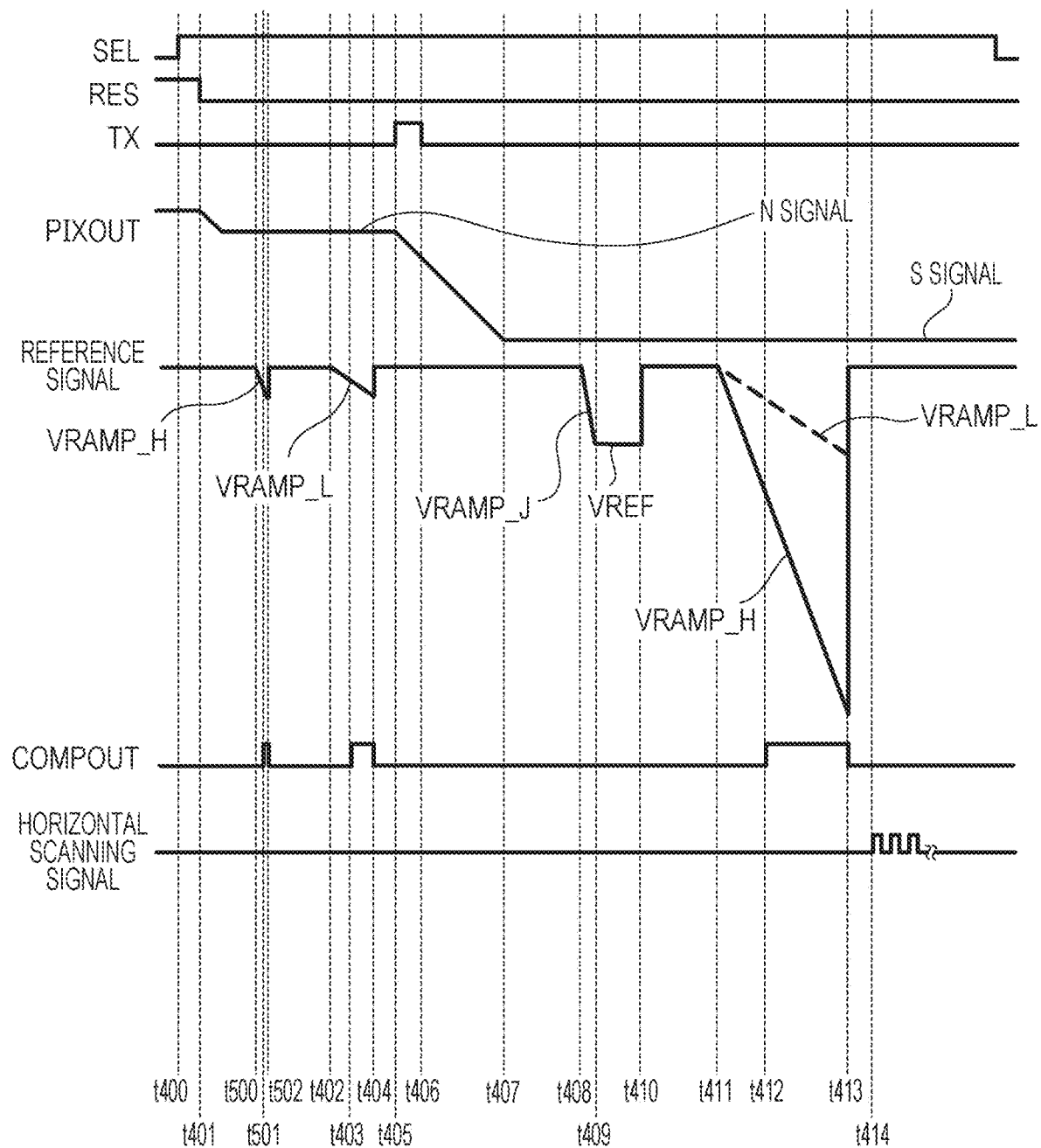
FIG. 5 is a drive timing chart illustrating a signal processing method according to the second embodiment.

FIG. 5 is an example of a drive timing chart of the photoelectric conversion apparatus 1 that performs the signal processing method according to this embodiment.

FIG. 5 shows time on the horizonal axis and voltage on the vertical axis, schematically illustrating the timing of the driving pulses, the pixel signal, and the reference signal. The individual control signals shown in FIG. 5 correspond to the control signals illustrated in FIG. 2. The period from time t408 to time t410 when the slope of the ramp signal VRAMP for use in A/D conversion is referred to as a first step. The period from time t411 to time t413 when A/D conversion of the S signal is performed is referred to as a second step, and the period from time t500 to time t404 when A/D conversion of the N signal is performed is referred to as a third step. The signal processing method other than that of the period of the third step is the same as in the first embodiment. A signal processing method of the third step different from the first embodiment will be described hereinbelow with reference to FIG. 5.

The signal processing method during the period from time t400 to time t500 is the same as the signal processing method during the period from time t400 to time t402 described with reference to FIG. 3.

During the period from time t500 to time t502, the voltage of the ramp signal VRAMP_H is decreased with time from the initial value by the reference-signal output circuit 30. The pixel signal PIXOUT and the ramp signal VRAMP_H are compared during the period from time t500 to time t502. The analog pixel signal PIXOUT is converted to a digital signal based on the result of comparison.

Upon the start of the voltage change of the ramp signal VRAMP_H at time t500, the counter circuit 40 starts to count the clock pulse signals and supplies the count signal CNT to the N memory 244 of each column. At time t501, the voltage of the ramp signal VRAMP_H falls below the pixel signal PIXOUT, and the signal value of the comparator output COMPOUT output from the comparator 221 changes. The value of the count signal CNT (count value) at that time is stored in the N memory 244. The value of the count signal CNT stored in the N memory 244 is a digital value obtained by converting the N signal from analog to digital. At time t502, the time-dependent voltage change of the ramp signal VRAMP_H is stopped, and the voltage is reset to the state at time t400. The counter circuit 40 stops counting the clock pulse signals and returns the count signal CNT to the initial value.

During the period from time t402 to time t404, the voltage of the ramp signal VRAMP_L is decreased with time from the initial value by the reference-signal output circuit 30. During the period from time t402 to time t404, the pixel signal PIXOUT and the ramp signal VRAMP_L are compared. The analog pixel signal PIXOUT is converted to a digital signal based on the result of comparison.

Upon the start of the voltage change of the ramp signal VRAMP_L at time t402, the counter circuit 40 starts to count the clock pulse signals and supplies the count signal CNT to the N memory 243 of each column. At time t403, the voltage of the ramp signal VRAMP_L falls below the pixel signal PIXOUT, and the signal value of the comparator output COMPOUT output from the comparator 221 changes. The value of the count signal CNT (count value) at that time is stored in the N memory 243. The value of the count signal CNT stored in the N memory 243 at that time is a digital value obtained by converting the N signal from analog. At time t404, the time-dependent voltage change of the ramp signal VRAMP_L is stopped, and the voltage is reset to the state at time t400. The counter circuit 40 stops counting the clock pulse signals and returns the count signal CNT to the initial value.

Thus, at the third step from time t500 to time t404, A/D conversion using the ramp signals VRAMP with different slopes for one N signal is continuously performed. Performing A/D conversion continuously means that after completing A/D conversion using one of multiple ramp signals, A/D conversion using another of the multiple ramp signals starts. In FIG. 5, after A/D conversion using the ramp signal VRAMP_H is completed, A/D conversion using the ramp signal VRAMP_L is started.

The signal processing method during the period from time t404 to time t414 is the same as the signal processing method during the period from time t404 to time t414 described with reference to FIG. 3. FIG. 5 illustrates a case in which the voltage of the pixel signal PIXOUT is lower than the threshold voltage VREF, and the ramp signal VRAMP_H is used at the second step. From time t414 onward, the column-signal processing circuits 20 are operated in sequence by the horizontal scanning signal output from the column selection circuit 50, and the signals stored in the flag memory 241, the S memory 242, the N memory, 243, and the N memory 244 are sent to the DSP 60. After calculation processing, the signals are output outside the photoelectric conversion apparatus 1.

At the DSP 60, a differential signal level (optic element) obtained by subtracting a digitized N signal from a digitized S signal is calculated. The S signal stored in the S memory 242 may take the difference from either the N signal stored in the N memory 243 or the N signal stored in the N memory 244. A digital signal with a low noise component can be obtained by calculating the difference between the S signal and the N signal using the result of A/D conversion of the N signal using the ramp signal VRAMP with the same slope as the ramp signal VRAMP selected at the A/D conversion of the S signal.

Although, in FIG. 5, the ramp signal VRAMP_H is used during the period from time t500 to time t502, and the ramp signal VRAMP_L is used during the period from time t402 to time t404, either of ramp signals with different slopes may be used first. In other words, the ramp signal VRAMP_L may be used during the period from time t500 to time t502, and the ramp signal VRAMP_H may be used during the period from time t402 to time t404.

Also in this embodiment, the first A/D conversion to a digital signal with the first bit number and the second A/D conversion to a digital signal with the second bit number smaller than the first bit number can be performed in different frames as the second step, as in the first embodiment. Before the first A/D conversion and the second A/D conversion, the A/D conversion of the N signal (third step) during the period from time t500 to time t404 in FIG. 5 may be performed as third A/D conversion.

This embodiment can also decrease the influence of the quantization error of the second A/D conversion, thereby reducing noise, by setting the ratio of the second slope to the first slope smaller than the ratio of the fourth slope to the third slope.

Thus, this embodiment can use ramp signals with different slopes and performs A/D conversion for converting an analog signal to digital signals of different bit numbers. In this operation, the ratio of the slopes of ramp signals in A/D conversion for a small bit number is set larger than the ratio of the slopes of ramp signals in A/D conversion for a large bit number. Performing this signal processing method can reduce the effect of a quantization error in A/D conversion for a small bit number, thereby reducing the noise.

This embodiment performs multiple A/D conversions using ramp signals with different slopes for one N signal in A/D conversion of the N signal. This allows the result of A/D conversion of the N signal using a ramp signal with the same slope as the ramp signal used in the A/D conversion of the S signal to be used for calculating the difference between the S signal and the N signal. Performing such signal processing allows obtaining digital signals with highly accurately reduced variations in characteristics among the column-signal processing circuits 20.

Third Embodiment

A photoelectric conversion apparatus according to a third embodiment of the present disclosure will be described with reference to FIGS. 6 and 7. The components corresponding to those in the first and second embodiments are denoted by the same reference signs, and descriptions thereof may be omitted or simplified.

This embodiment differs from the first and second embodiments in that A/D conversion is performed using ramp signals VRAMP with different slopes for one pixel signal PIXOUT (S signal and N signal). FIG. 6 is an example of a block diagram of the photoelectric conversion apparatus that performs the signal processing method according to this embodiment.

Figure 6:
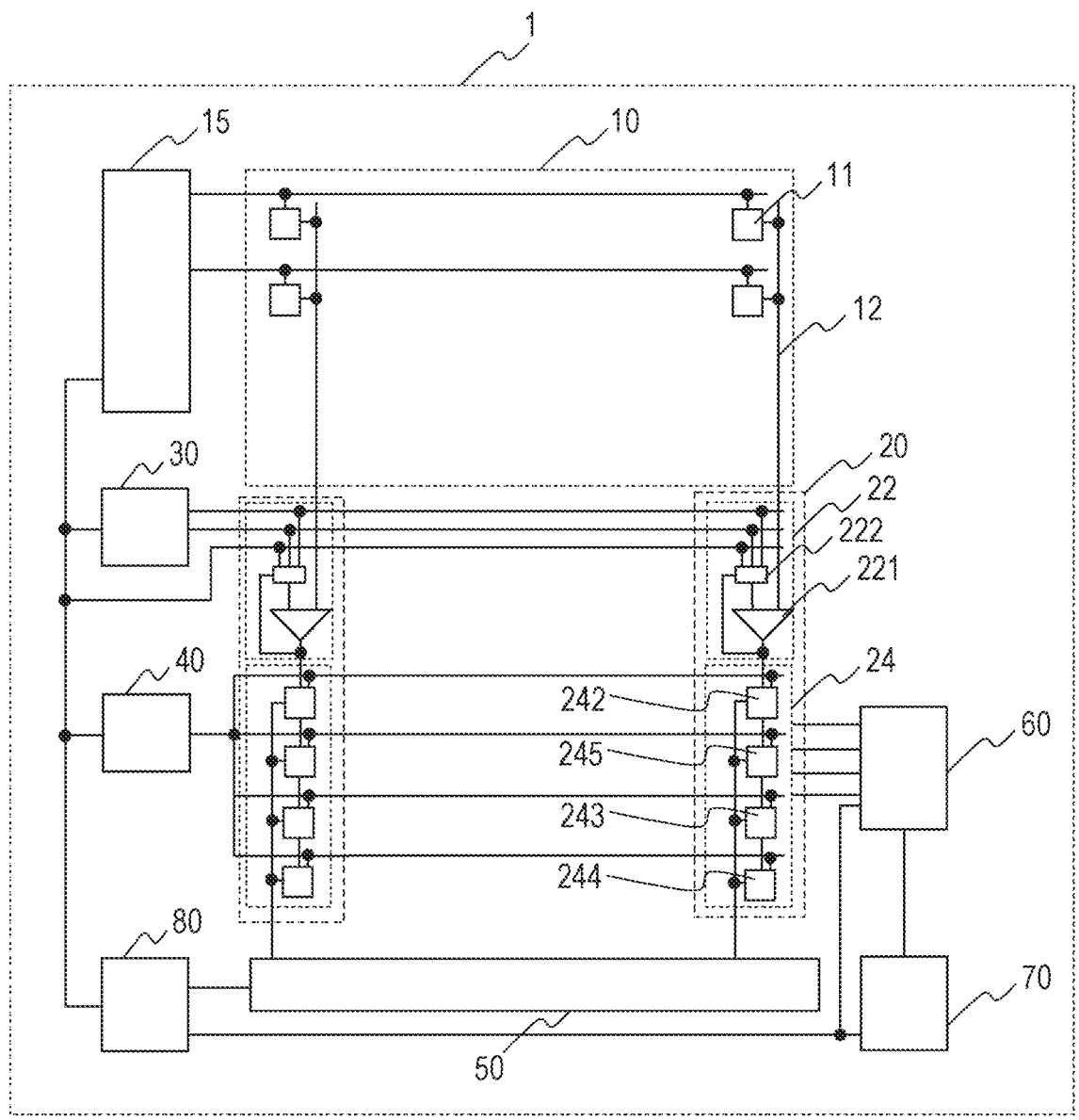
FIG. 6 is a block diagram illustrating a photoelectric conversion apparatus according to a third embodiment.

As illustrated in FIG. 6, the memory circuit 24 includes an S memory 245 instead of the flag memory 241 in the configuration of FIG. 4. Similarly to the S memory 242, the S memory 245 stores a digital signal obtained by converting the S signal from analog to digital.

Figure 7:
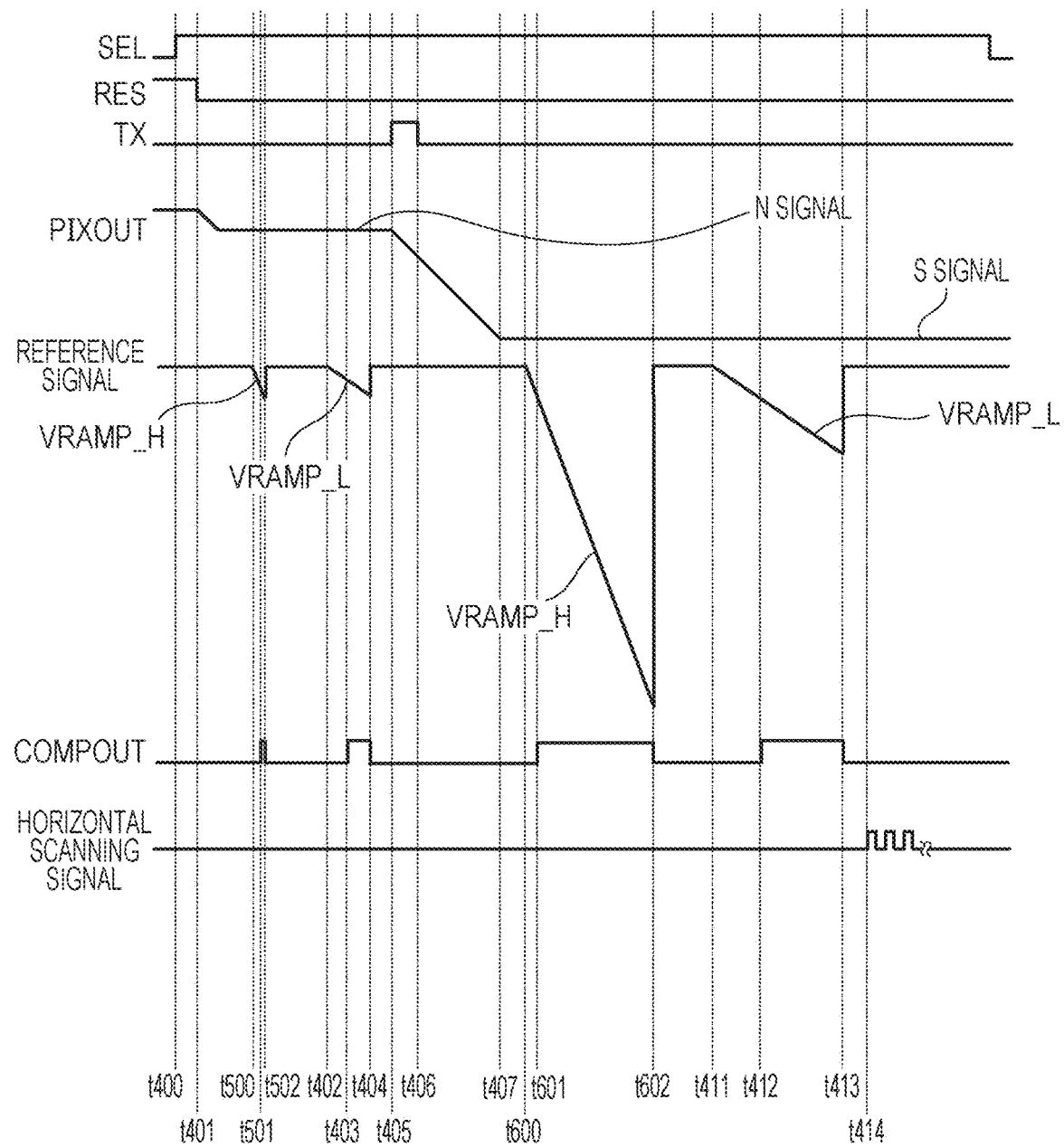
FIG. 7 is a drive timing chart illustrating a signal processing method according to the third embodiment.

FIG. 7 is an example of a drive timing chart of the photoelectric conversion apparatus 1 that performs the signal processing method according to this embodiment.

FIG. 7 shows time on the horizonal axis and voltage on the vertical axis, schematically illustrating the timing of the driving pulses, the pixel signal, and the reference signal. The individual control signals shown in FIG. 7 correspond to the control signals illustrated in FIG. 2. The period from time t600 to time t413 when A/D conversion of the S signal is performed is referred to as a second step, and the period from time t500 to time t404 when A/D conversion of the N signal is performed is referred to as a third step. A signal processing method of the second step different from the second embodiment will be described hereinbelow with reference to FIG. 7.

The signal processing method during the period from time t400 to time t407 is the same as the signal processing method during the period from time t400 to time t402 described with reference to FIG. 5.

During the period from time t600 to time t602, the voltage of the ramp signal VRAMP_H is decreased with time from the initial value by the reference-signal output circuit 30. The pixel signal PIXOUT and the ramp signal VRAMP_H are compared. The pixel signal PIXOUT is converted to a digital signal based on the result of comparison.

Upon the start of the voltage change of the ramp signal VRAMP_H at time t600, the counter circuit 40 starts to count the clock pulse signals and supplies the count signal CNT to the S memory 245 of each column.

At time t601, the voltage of the ramp signal VRAMP_H falls below the pixel signal PIXOUT, and the signal value of the comparator output COMPOUT changes. The value of the count signal CNT (count value) at that time is stored in the S memory 245. The value of the count signal CNT stored in the S memory 245 is a digital value obtained by converting the S signal from analog to digital.

At time t602, the time-dependent voltage change of the ramp signal VRAMP_H is stopped, and the voltage is reset to the state at time t400. The counter circuit 40 stops counting the clock pulse signals and returns the count signal CNT to the initial value.

During the period from time t411 to time t413, the voltage of the ramp signal VRAMP_L is decreased with time from the initial value by the reference-signal output circuit 30. The pixel signal PIXOUT and the ramp signal VRAMP_L are compared. The pixel signal PIXOUT is converted to a digital signal based on the result of comparison.

Upon the start of the voltage change of the ramp signal VRAMP_L at time t411, the counter circuit 40 starts to count the clock pulse signals and supplies the count signal CNT to the S memory 242 of each column.

At time t412, the voltage of the ramp signal VRAMP_L falls below the pixel signal PIXOUT, and the signal value of the comparator output COMPOUT changes. The value of the count signal CNT (count value) at that time is stored in the S memory 242. The value of the count signal CNT stored in the S memory 242 at that time is a digital value obtained by converting the S signal from analog.

At time t413, the time-dependent voltage change of the ramp signal VRAMP_L is stopped, and the voltage is reset to the state at time t400. The counter circuit 40 stops counting the clock pulse signals and returns the count signal CNT to the initial value.

Thus, at the second step from time t600 to time t413, A/D conversion using the ramp signals VRAMP with different slopes for one S signal is continuously performed. Performing A/D conversion continuously means that after completing A/D conversion using one of multiple ramp signals, A/D conversion using another of the multiple ramp signals starts. In FIG. 7, after A/D conversion using the ramp signal VRAMP_H is completed, A/D conversion using the ramp signal VRAMP_L is started.

From time t414 onward, the column-signal processing circuits 20 are operated in sequence in response to horizontal scanning signals output from the column selection circuit 50, and the signals stored in the S memory 242, the S memory, 245, the N memory 243, and the N memory 244 are sent to the DSP 60. After calculation processing, the signals are output outside the photoelectric conversion apparatus 1.

At the DSP 60, a differential signal level (optic element) obtained by subtracting a digitized N signal from a digitized S signal is calculated. The S signals stored in the S memory 242 and the S memory 245 may take the difference from either the N signal stored in the N memory 243 or the N signal stored in the N memory 244. A digital signal with a low noise component can be obtained by calculating the difference between the S signals and the N signal using the result of A/D conversion of the N signal using the ramp signal VRAMP with the same slope as the ramp signal VRAMP selected at the A/D conversion of the S signals.

Although, in FIG. 7, the ramp signal VRAMP_H is used during the period from time t600 to time t602, and the ramp signal VRAMP_L is used during the period from time t411 to time t413, either of ramp signals with different slopes may be used first. In other words, the ramp signal VRAMP_L may be used during the period from time t600 to time t602, and the ramp signal VRAMP_H may be used during the period from time t411 to time t413.

Also in this embodiment, the first A/D conversion to a digital signal with the first bit number and the second A/D conversion to a digital signal with the second bit number smaller than the first bit number can be performed in different frames as the second step, as in the first and second embodiments. Before the first A/D conversion and the second A/D conversion, the A/D conversion of the N signal (third step) during the period from time t500 to time t404 in FIG. 7 may be performed as third A/D conversion. This embodiment can also decrease the influence of the quantization error of the second A/D conversion, thereby reducing noise, by setting the ratio of the second slope to the first slope smaller than the ratio of the fourth slope to the third slope.

Thus, this embodiment can use ramp signals with different slopes and performs A/D conversion for converting an analog signal to digital signals of different bit numbers. In this operation, the ratio of the slopes of ramp signals in A/D conversion for a small bit number is set larger than the ratio of the slopes of ramp signals in A/D conversion for a large bit number. Performing this signal processing method can reduce the effect of a quantization error in A/D conversion for a small bit number, thereby reducing the noise.

This embodiment performs multiple A/D conversions using ramp signals with different slopes for one N signal in A/D conversion of the N signal. This allows the result of A/D conversion of the N signal using a ramp signal with the same slope as the ramp signal used in the A/D conversion of the S signal to be used for calculating the difference between the S signal and the N signal. Performing such signal processing allows obtaining digital signals with highly accurately reduced variations in characteristics among the column-signal processing circuits 20.

Furthermore, this embodiment does not compare the pixel signal with the threshold voltage, which eliminates the need for the flag memory, thereby reducing the circuit area.

Fourth Embodiment

A photoelectric conversion apparatus according to a fourth embodiment of the present disclosure will be described with reference to FIGS. 8 and 9. The components corresponding to those in the first to third embodiments are denoted by the same reference signs, and descriptions thereof may be omitted or simplified.

This embodiment differs from the first to third embodiments in that A/D conversions are performed in parallel using ramp signals VRAMP with different slopes for one pixel signal PIXOUT (S signal and N signal). FIG. 6 is an example of a block diagram of the photoelectric conversion apparatus that performs the signal processing method according to this embodiment.

Figure 8:
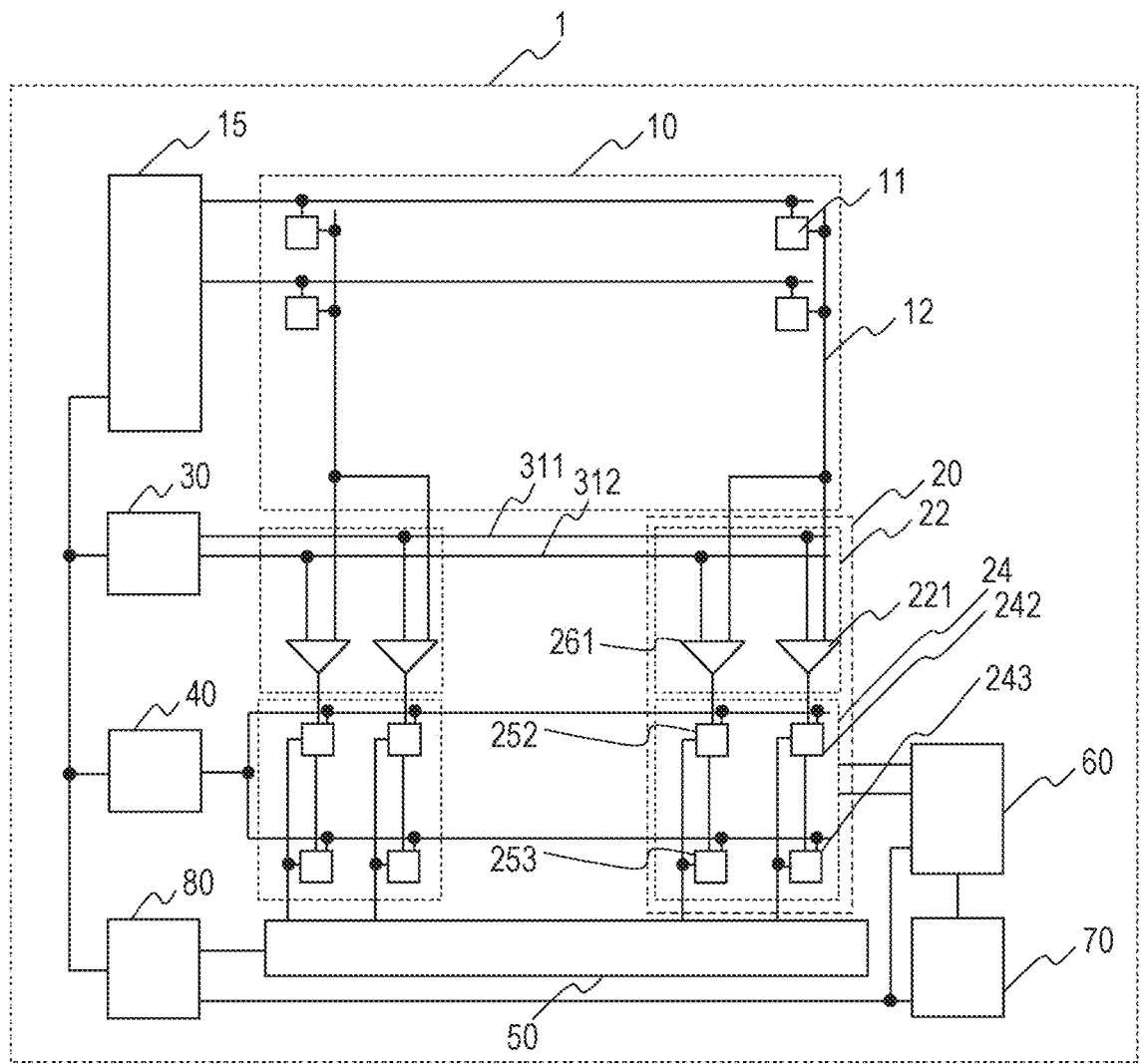
FIG. 8 is a block diagram illustrating a photoelectric conversion apparatus according to a fourth embodiment.

As illustrated in FIG. 8, each column-signal processing circuit 20 includes multiple channels per column in correspondence with the ramp signal VRAMP_L and the ramp signal VRAMP_H. The column-signal processing circuit 20 includes an A/D conversion circuit 22 and a memory circuit 24. The A/D conversion circuit 22 includes a comparator 221 and a comparator 261. A pixel signal output from the pixel 11 is input to one input terminal of each of the comparator 221 and the comparator 261 of the column-signal processing circuit 20 through a corresponding signal line 12. The reference-signal output circuit 30 inputs the ramp signal VRAMP_H to the other input terminal of the comparator 221 through a wiring line 311. The reference-signal output circuit 30 inputs the ramp signal VRAMP_L to the other input terminal of the comparator 261 through a wiring line 312.

Thus, the photoelectric conversion apparatus 1 includes at least one signal line 12 corresponding to the pixel 11 of one column, and the A/D conversion circuit 22 includes multiple comparators connected to the one signal line 12.

The memory circuit 24 includes an S memory 242, an S memory 252, an N memory 243, and an N memory 253. The comparator 221 outputs a comparison result signal representing the result of comparison between the pixel signal input through the signal line 12 and the ramp signal VRAMP_H to the S memory 242 and the N memory 243. The S memory 242 and the N memory 243 store a count signal CNT output from the counter circuit 40 based on a change in signal level of the comparison result signal output from the comparator 221. The comparator 261 outputs a comparison result signal representing the result of comparison between the pixel signal input through the signal line 12 and the ramp signal VRAMP_L to the S memory 252 and the N memory 253. The S memory 252 and the N memory 253 store a count signal CNT output from the counter circuit 40 based on a change in the signal level of the comparison result signal output from the comparator 261. Thus, the memory circuit 24 stores the count signal CNT corresponding to the value of the pixel signal as a digital signal corresponding to the pixel signal, and the pixel signal output from the pixel 11 is converted from analog to digital.

Figure 9:
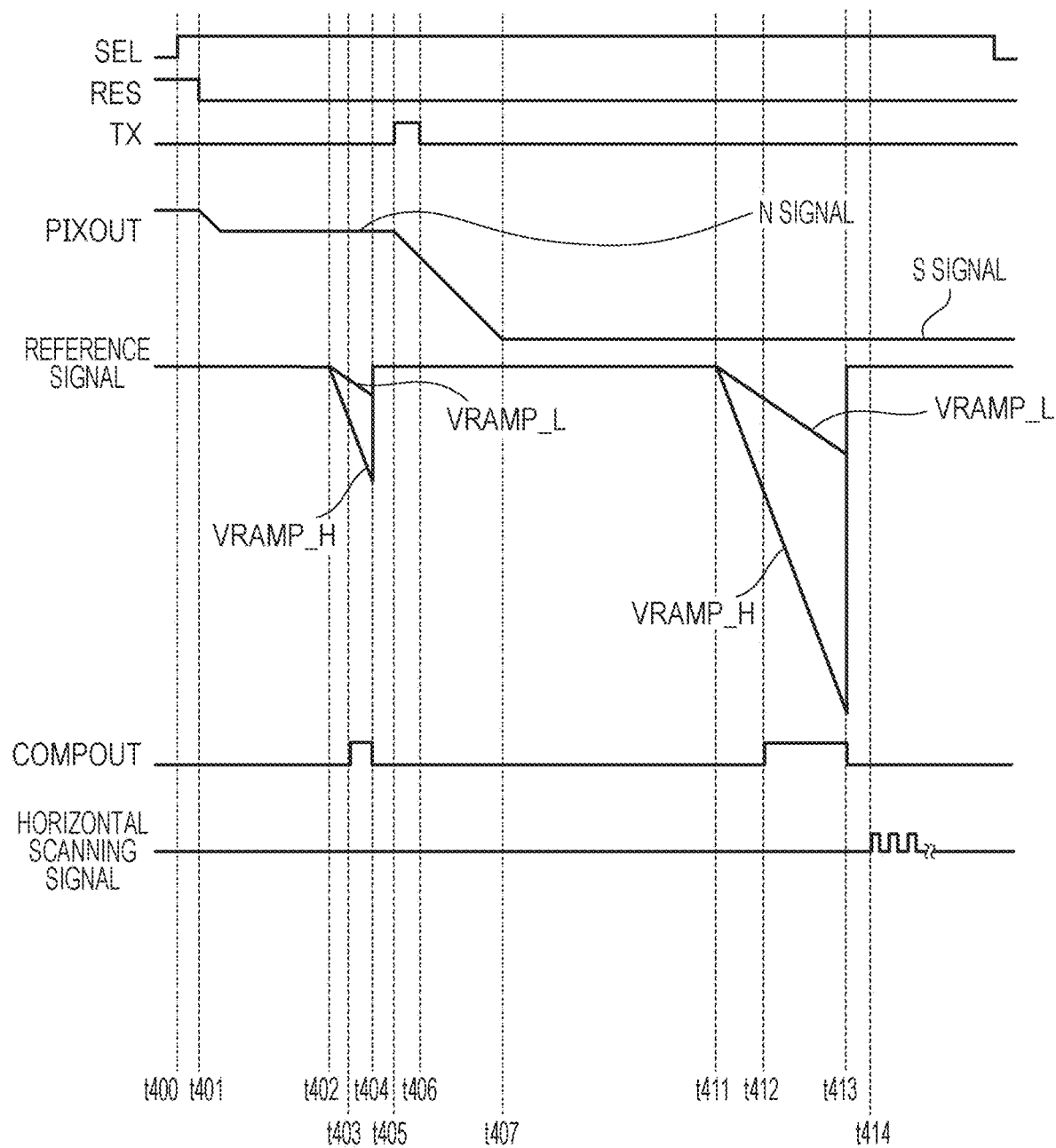
FIG. 9 is a drive timing chart illustrating a signal processing method according to the fourth embodiment.

FIG. 9 is an example of a drive timing chart of the photoelectric conversion apparatus 1 that performs the signal processing method according to this embodiment.

FIG. 9 shows time on the horizontal axis and voltage on the vertical axis, schematically illustrating the timing of the driving pulses, the pixel signal, and the reference signal. The individual control signals shown in FIG. 9 correspond to the control signals illustrated in FIG. 2. FIG. 9 illustrates the driving of signal processing of the multiple channels (the comparator 221 and the comparator 261) of each column-signal processing circuit 20. A channel in which the comparator 221, the S memory 242, and the N memory 243 are electrically connected is referred to as a first channel, and a channel in which the comparator 261, the S memory 252, and the N memory 253 are electrically connected is referred to as a second channel.

The period from time t411 to time t413 when A/D conversion of the S signal is performed is referred to as a second step, and the period from time t402 to time t404 when A/D conversion of the N signal is performed is referred to as a third step. A signal processing method of the second step and the third step in the first channel different from the third embodiment will be described with reference to FIG. 9.

The signal processing method during the period from time t400 to time t401 is the same as the signal processing method during the period from time t400 to time t401 described with reference to FIG. 7.

During the period from time t402 to time t404, the voltage of the ramp signal VRAMP_H is decreased with time from the initial value by the reference-signal output circuit 30. The pixel signal PIXOUT and the ramp signal VRAMP_H are compared for the period from time t402 to time t404. The analog pixel signal PIXOUT is converted to a digital signal based on the result of comparison.

Upon the start of the voltage change of the ramp signal VRAMP_H at time t402, the counter circuit 40 starts to count the clock pulse signals and supplies the count signal CNT to the N memory 243 of each column. At time t403, the voltage of the ramp signal VRAMP_H falls below the pixel signal PIXOUT, and the signal value of the comparator output COMPOUT changes. The value of the count signal CNT (count value) at that time is stored in the N memory 243. The value of the count signal CNT stored in the N memory 243 is a digital value obtained by converting the N signal from analog to digital. At time t404, the time-dependent voltage change of the ramp signal VRAMP_H is stopped, and the voltage is reset to the state at time t400. The counter circuit 40 stops counting the clock pulse signals and returns the count signal CNT to the initial value.

In the second channel, the driving is performed using the ramp signal VRAMP_L with the comparator 261 and the N memory 253.

Accordingly, at the third step during the period from time t402 to time t404, A/D conversions using the ramp signals VRAMP with different slopes are performed for one N signal. Performing A/D conversions in parallel means that at least part of the period of A/D conversion using one of multiple ramp signals overlaps with at least part of the period of A/D conversion using another of the multiple ramp signals. In FIG. 9, at least part of the period of A/D conversion using the ramp signal VRAMP_H overlaps with at least part of the period of A/D conversion using the ramp signal VRAMP_L.

At time t405, the control signal TX is raised to a high level, and at time t406, the control signal TX is lowered to a low level. This causes the electric charge generated by the light incident on the photoelectric converter 400 to be transferred to the FD section 420. The amplifying transistor 430 outputs a voltage signal based on the electric charge transferred to the FD section 420. This voltage signal is output to the signal line 12 via the selection transistor 440, and the pixel signal is input to one input terminal of the comparator 221. This signal is the S signal, which is part of the pixel signal PIXOUT. The S signal is an analog signal with a voltage corresponding to the amount of light received by the photoelectric converter 400 during one frame period.

During the period from time t411 to time t413, the voltage of the ramp signal VRAMP_H is decreased with time from the initial value by the reference-signal output circuit 30. The pixel signal PIXOUT and the ramp signal VRAMP_H are compared. The pixel signal PIXOUT is converted to a digital signal based on the comparison result.

Upon the start of the voltage change of the ramp signal VRAMP_H at time t411, the counter circuit 40 starts to count the clock pulse signals and supplies the count signal CNT to the S memory 242 of each column.

At time t412, the voltage of the ramp signal VRAMP_H falls below the pixel signal PIXOUT, and the signal value of the comparator output COMPOUT changes. The value of the count signal CNT (count value) at that time is stored in the S memory 242. The value of the count signal CNT stored in the S memory 242 at that time is a digital value obtained by converting the S signal from analog.

At time t413, the time-dependent voltage change of the ramp signal VRAMP_H is stopped, and the voltage is reset to the state at time t400. The counter circuit 40 stops counting the clock pulse signals and returns the count signal CNT to the initial value.

In the second channel, the driving is performed using the ramp signal VRAMP_L with the comparator 261 and the S memory 252.

Accordingly, at the second step during the period from time t411 to time t413, A/D conversions using the ramp signals VRAMP with different slopes are performed for one S signal. Performing A/D conversions in parallel means that at least part of the period of A/D conversion using one of multiple ramp signals overlaps with at least part of the period of A/D conversion using another of the multiple ramp signals. In FIG. 9, at least part of the period of A/D conversion using the ramp signal VRAMP_H overlaps with at least part of the period of A/D conversion using the ramp signal VRAMP_L.

From time t414 onward, the column-signal processing circuits 20 are operated in sequence in response to the horizontal scanning signals output from the column selection circuit 50, and the signals stored in the S memory 242, the S memory 252, the N memory 243, and the N memory 253 are sent to the DSP 60. After calculation processing, the signals are output outside the photoelectric conversion apparatus 1.

At the DSP 60, a differential signal level (optic element) obtained by subtracting a digitized N signal from a digitized S signal is calculated. The S signals stored in the S memory 242 and the S memory 252 may take the difference from either the N signal stored in the N memory 243 or the N signal stored in the N memory 253. A digital signal with a low noise component can be obtained by calculating the difference between the S signal and the N signal using the result of A/D conversion of the N signal using the ramp signal VRAMP with the same slope as the ramp signal VRAMP selected at the A/D conversion of the S signal.

Also in this embodiment, the first A/D conversion to a digital signal with the first bit number and the second A/D conversion to a digital signal with the second bit number smaller than the first bit number can be performed in different frames as the second step, as in the first to third embodiments. Before the first A/D conversion and the second A/D conversion, the A/D conversion of the N signal (third step) during the period from time t402 to time t404 in FIG. 9 may be performed as third A/D conversion.

This embodiment can also decrease the influence of the quantization error of the second A/D conversion, thereby reducing noise, by setting the ratio of the second slope to the first slope smaller than the ratio of the fourth slope to the third slope.

Thus, this embodiment can use ramp signals with different slopes and performs A/D conversion for converting an analog signal to digital signals of different bit numbers. In this operation, the ratio of the slopes of ramp signals in A/D conversion for a small bit number is set larger than the ratio of the slopes of ramp signals in A/D conversion for a large bit number. Performing this signal processing method can reduce the effect of a quantization error in A/D conversion for a small bit number, thereby reducing the noise.

This embodiment performs multiple A/D conversions using ramp signals with different slopes for one N signal in A/D conversion of the N signal. This allows the result of A/D conversion of the N signal using a ramp signal with the same slope as the ramp signal used in the A/D conversion of the S signal to be used for calculating the difference between the S signal and the N signal. Performing such signal processing allows obtaining digital signals with highly accurately reduced variations in characteristics among the column-signal processing circuits 20.

Furthermore, this embodiment does not compare the pixel signal with the threshold voltage, which eliminates the need for the flag memory, thereby reducing the circuit area.

Furthermore, this embodiment can perform higher-speed A/D conversion than continuous A/D conversion by performing A/D conversion using ramp signals with different slopes in parallel.

Fifth Embodiment

A photoelectric conversion method according to a fifth embodiment of the present disclosure will be described with reference to FIGS. 10 to 13B. The components corresponding to those in the first to fourth embodiments are denoted by the same reference signs, and descriptions thereof may be omitted or simplified.

This embodiment is a signal processing method for correction processing of A/D conversion, which is applicable to any of the first, second, third, and fourth embodiments. This embodiment is a correction-value acquisition method for correcting the linearity of the ramp signal VRAMP (reference signal). An example of calculation of a slope ratio ($\alpha 1$ and $\alpha 2$), which is a correction value for the ramp signal VRAMP, and an offset to be added ($\beta 1$ and $\beta 2$) will be described.

Figure 10:
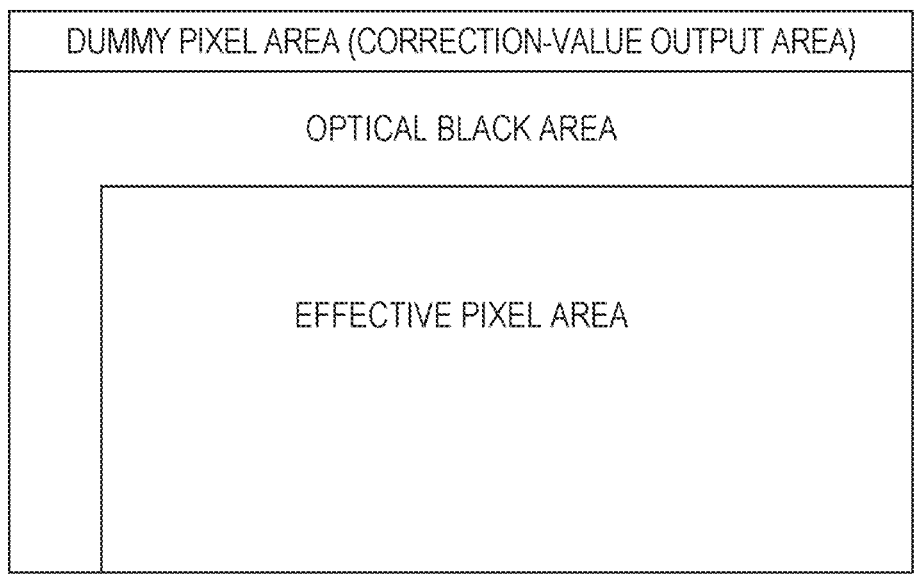
FIG. 10 is a plan view of a pixel array section according to a fifth embodiment.

FIG. 10 is an example of a plan view of the pixel array section 10 of the photoelectric conversion apparatus 1 that performs the signal processing method according to this embodiment.

As shown in FIG. 10, an optical black area is disposed on the outer periphery of an effective pixel area.

A dummy pixel area (a correction-value calculation area) is disposed on the outer periphery of the optical black area. This disposition is illustrative only and can be changed as appropriate. For example, the dummy pixel area may be disposed between the optical black area and the effective pixel area. Multiple dummy pixel areas may be dispersed on the outermost periphery of the pixel area and between the optical black area and the effective pixel area. The optical black area includes multiple optical black pixels each including a shaded photoelectric converter. Typically, the structure of the optical black pixel is the same as the structure of the effective pixel except that the photoelectric converter is shaded. The dummy pixel area includes multiple dummy pixels each including no photoelectric converter but including the amplifying transistor 430 and the selection transistor 440 illustrated in FIG. 2. The dummy pixel may further include the reset transistor 455 and the transfer transistor 410. Photoelectric conversion signals output from the effective pixel area are used as, for example, image capturing signals, in the subsequent stage. Signals output from the dummy pixel area are used to correct the linearity of the ramp signal VRAMP (reference signal). The signals output from the dummy pixel area include not only the signals output from the dummy pixel but also signals output from the signal line 12 corresponding to the dummy pixel area. One example of the signals output from the signal line 12 corresponding to the dummy pixel area is signals output from a circuit (for example, a voltage source) that is connected to the signal line 12 and that applies a predetermined voltage to the signal line 12. In this embodiment, a correction value including a slope ratio $\alpha$ and an offset $\beta$ is calculated using the signals output from the dummy pixel area. The dummy pixels are each connected to one input terminal of the comparator 221 via the signal line 12. During the period in which the signals of the dummy pixels are read, for example, a voltage source (not shown) outputs a fixed voltage so that the voltage input to the comparator 221 through the signal line 12 is fixed. In this embodiment, fixed voltages V1 and V2 higher than V1 are used. In this embodiment, for the first A/D conversion for converting a pixel signal to a digital signal with the first bit number, a combination of a ramp signal VRAMP_L1 (first ramp signal) and a ramp signal VRAMP_H1 (second ramp signal) is used. In this embodiment, for the second A/D conversion for converting a pixel signal to a digital signal with the second bit number, a combination of a ramp signal VRAMP_L2 (third ramp signal) and a ramp signal VRAMP_H2 (fourth ramp signal) is used. Operations for acquiring correction values for used in the first A/D conversion and the second A/D conversion may be performed in the same frame or different frames. Here, the operation for acquiring a correction value for use in the first A/D conversion and the operation for acquiring a correction value for use in the second A/D conversion are performed in the same frame. Performing the correction-value acquisition operations not in different frames but in the same frame reduces the number of times to obtain the correction values in switching between modes, improving the signal processing speed.

FIGS. 11A to 11D and FIGS. 12A to 12D are examples of a drive timing chart of the photoelectric conversion apparatus 1 that performs the signal processing method according to this embodiment.

FIGS. 11A to 11D and FIGS. 12A to 12D show time on the horizontal axis and voltage on the vertical axis, schematically illustrating the timing of the driving pulses, the dummy-pixel-area output signal, and the reference signal. FIGS. 11A to 11D and FIGS. 12A to 12D illustrate a signal processing method in converting a fixed voltage output from the dummy pixel area (a signal output from the signal line 12) from analog to digital. In FIGS. 11A to 11D, V1 is used as the fixed voltage, and in FIGS. 12A to 12D, V2 is used as the fixed voltage. In FIGS. 11A and 11B and FIGS. 12A and 12B illustrating the driving of the first A/D conversion, a combination of the ramp signal VRAMP_L1 and the ramp signal VRAMP_H1 is used as the ramp signal VRAMP. In FIG. 11C and FIG. 11D and FIG. 12C and FIG. 12D illustrating the driving of the second A/D conversion, a combination of the ramp signal VRAMP_L2 and the ramp signal VRAMP_H2 is used. The period during which the slope of the ramp signal VRAMP for use in A/D conversion is set is referred to as a first step. The period of A/D conversion is referred to as a second step.

Figure 11A:
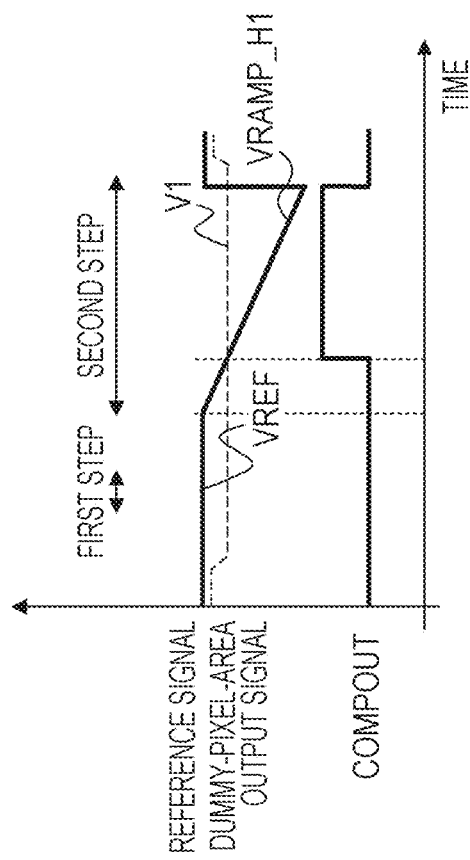
FIGS. 11A to 11D are drive timing charts illustrating a signal processing method according to the fifth embodiment.

In FIG. 11A, the threshold voltage VREF is set to, for example, a minimum value, at the first step so that the fixed voltage V1 exceeds the threshold voltage VREF all the time. At the second step, the A/D conversion of the fixed voltage V1 is performed using the ramp signal VRAMP_L1 all the time. In this case, the digital value obtained by converting the fixed voltage V1 from analog to digital is referred to as D1.

Figure 11B:
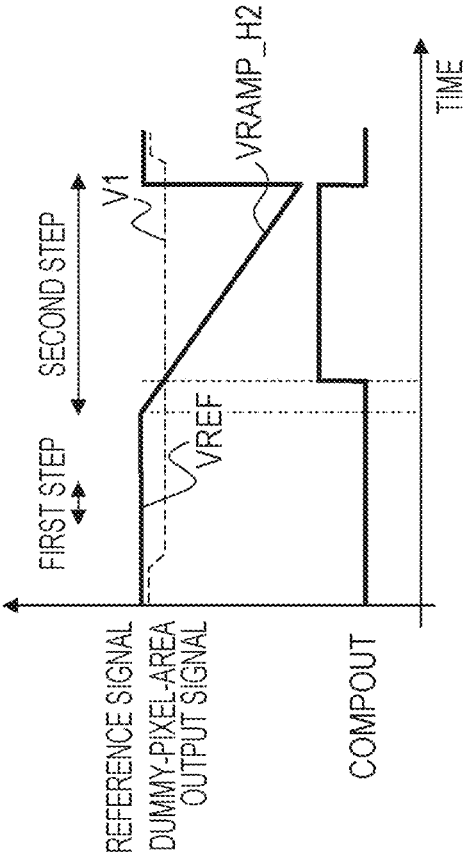

In FIG. 11B, the threshold voltage VREF is set to, for example, a maximum value, at the first step so that the fixed voltage V1 falls below the threshold voltage VREF all the time. At the second step, the A/D conversion of the fixed voltage V1 is performed using the ramp signal VRAMP_H1 all the time. In this case, the digital value obtained by converting the fixed voltage V1 from analog to digital is referred to as D3.

Figure 11C:
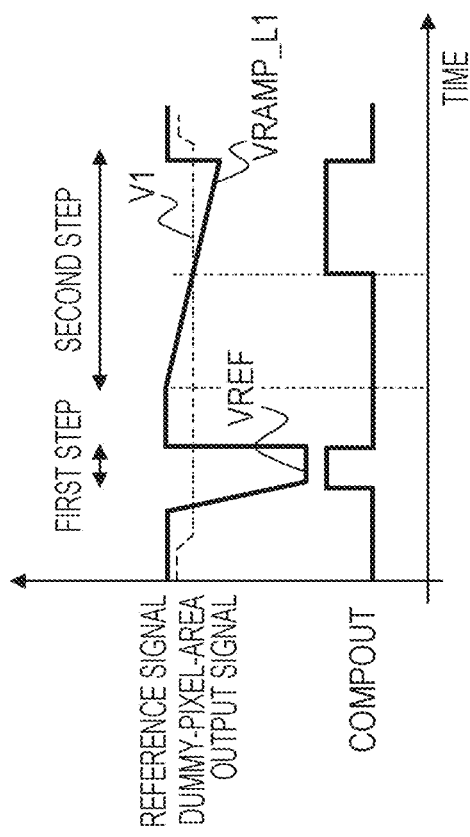

In FIG. 11C, the threshold voltage VREF is set to, for example, a minimum value, at the first step so that the fixed voltage V1 exceeds the threshold voltage VREF all the time. At the second step, the A/D conversion of the fixed voltage V1 is performed using the ramp signal VRAMP_L2 all the time. In this case, the digital value obtained by converting the fixed voltage V1 from analog to digital is referred to as D2.

Figure 11D:
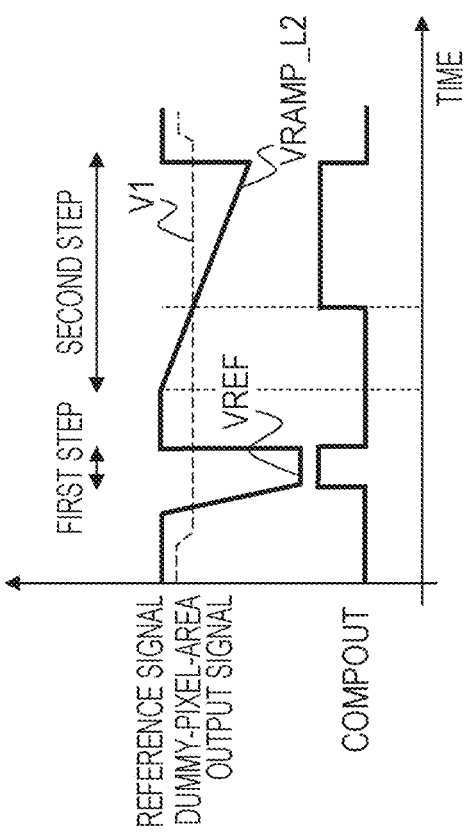

In FIG. 11D, the threshold voltage VREF is set to, for example, a maximum value, at the first step so that the fixed voltage V1 falls below the threshold voltage VREF all the time. At the second step, the A/D conversion of the fixed voltage V1 is performed using the ramp signal VRAMP_H2 all the time. In this case, the digital value obtained by converting the fixed voltage V1 from analog to digital is referred to as D4.

Figure 12A:
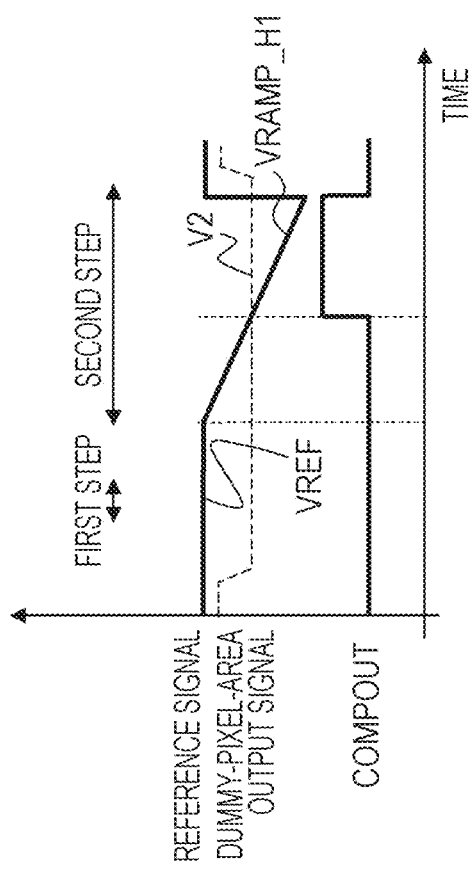
FIGS. 12A to 12D are drive timing charts illustrating a signal processing method according to the fifth embodiment.

In FIG. 12A, the threshold voltage VREF is set to, for example, a minimum value, at the first step so that the fixed voltage V2 exceeds the threshold voltage VREF all the time. At the second step, the A/D conversion of the fixed voltage V2 is performed using the ramp signal VRAMP_L1 all the time. In this case, the digital value obtained by converting the fixed voltage V2 from analog to digital is referred to as D5.

Figure 12B:
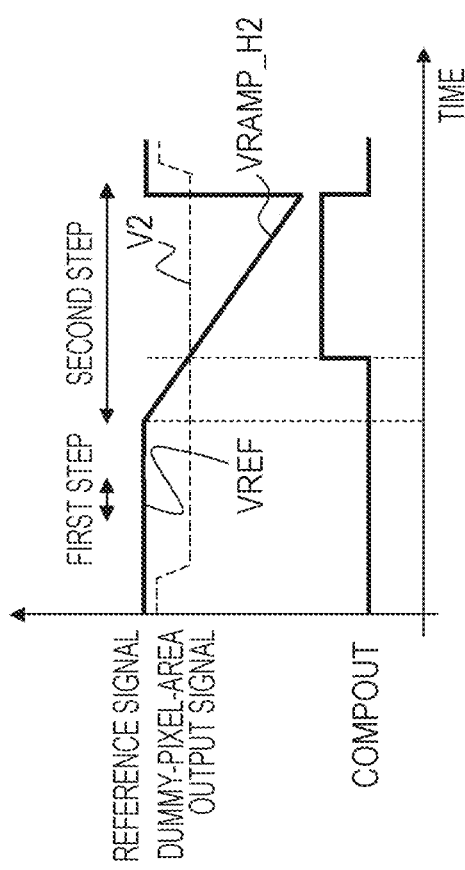

In FIG. 12B, the threshold voltage VREF is set to, for example, a maximum value, at the first step so that the fixed voltage V2 falls below the threshold voltage VREF all the time. At the second step, the A/D conversion of the fixed voltage V2 is performed using the ramp signal VRAMP_H1 all the time. In this case, the digital value obtained by converting the fixed voltage V2 from analog to digital is referred to as D7.

Figure 12C:
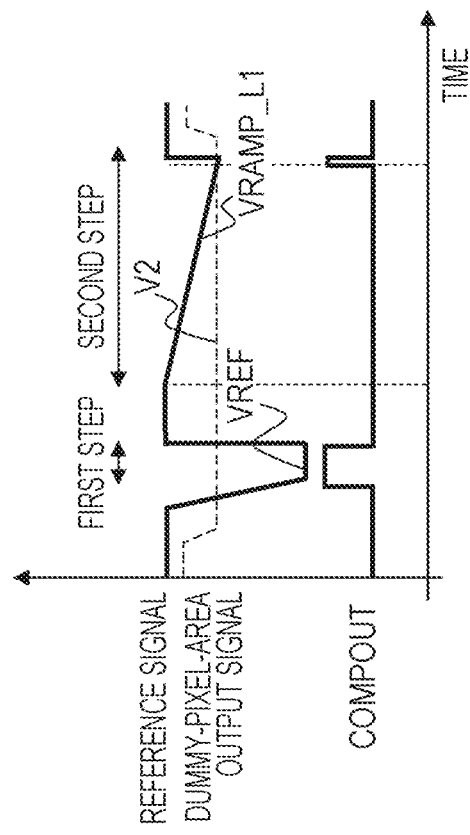

In FIG. 12C, the threshold voltage VREF is set to, for example, a minimum value, at the first step so that the fixed voltage V2 exceeds the threshold voltage VREF all the time. At the second step, the A/D conversion of the fixed voltage V2 is performed using the ramp signal VRAMP_L2 all the time. In this case, the digital value obtained by converting the fixed voltage V2 from analog to digital is referred to as D6.

Figure 12D:
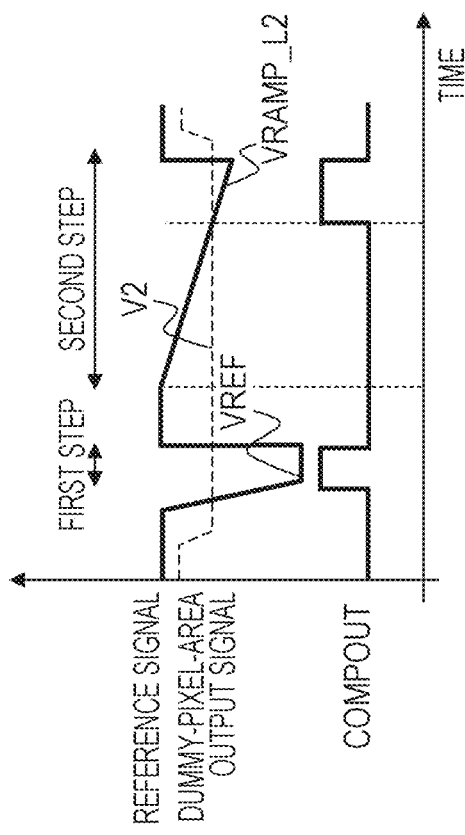

In FIG. 12D, the threshold voltage VREF is set to, for example, a maximum value, at the first step so that the fixed voltage V2 falls below the threshold voltage VREF all the time. At the second step, the A/D conversion of the fixed voltage V2 is performed using the ramp signal VRAMP_H2 all the time. In this case, the digital value obtained by converting the fixed voltage V2 from analog to digital is referred to as D8.

Figure 13A:
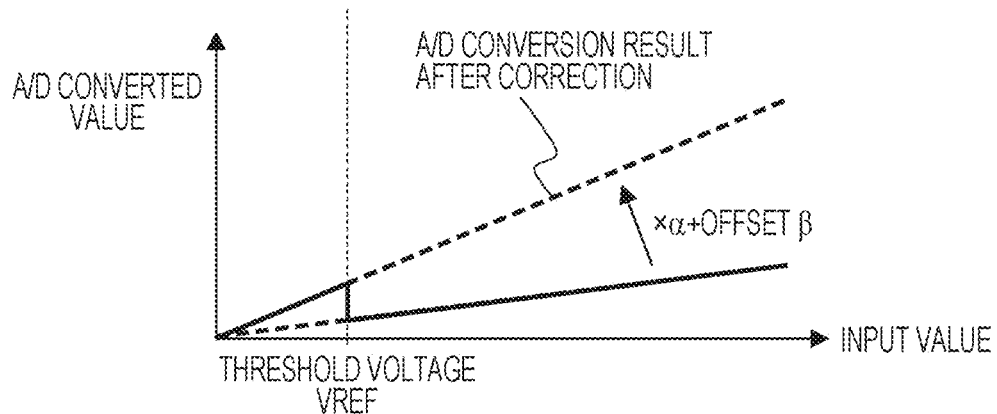
FIGS. 13A and 13B are diagrams illustrating correction processing of the signal processing method according to the fifth embodiment.
Figure 13B:
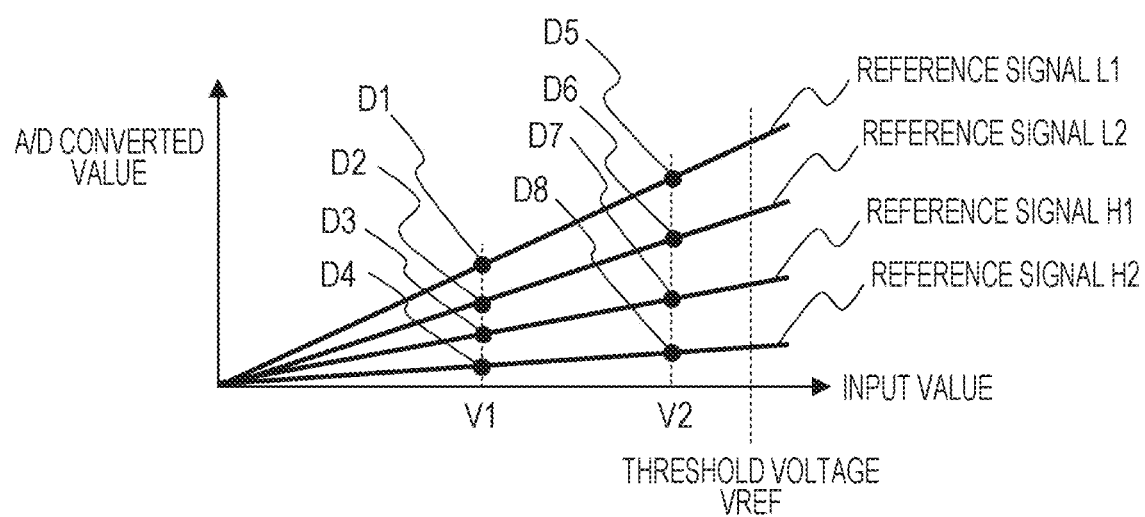

FIGS. 13A and 13B are diagrams illustrating the correction processing of the photoelectric conversion apparatus 1 according to this embodiment. In FIGS. 13A and 13B, the horizontal axis represents the value input to one of the input terminals of the comparator through the signal line 12, and the vertical axis represents a digital value after A/D conversion.

The solid line in FIG. 13A represents a digital value input to the DSP 60. A signal whose amplitude is smaller than the threshold voltage VREF (larger in voltage) is converted by the ramp signal VRAMP_L, and a signal whose amplitude is larger than the threshold voltage VREF (smaller in voltage) is A/D converted by the ramp signal VRAMP_H. This causes a difference in digital value after A/D conversion from the input value (the voltage of the pixel signal) around the threshold voltage VREF used for the A/D conversion of the S signal of the effective pixel.

For this reason, in this embodiment, for example, an S signal whose signal amplitude is larger than the threshold voltage VREF for use in the A/D conversion of the S signal of the effective pixel is multiplied by the slope ratio α between the ramp signal VRAMP_L and the ramp signal VRAMP_H with the DSP 60. Furthermore, the difference and so on are corrected so that the input value (the voltage of the pixel signal) and the digital value after A/D conversion form a straight line by adding a predetermined offset B so that no difference is made around the threshold voltage VREF. In other words, this embodiment corrects the difference at combination with high accuracy by performing gain correction and offset correction on the signal A/D converted with the ramp signal VRAMP_L or the ramp signal VRAMP_H. If the S signal is output without being corrected unlike this embodiment, a difference can occur in the S signal level at a certain luminance to form an image with a feeling of strangeness. However, this embodiment prevents such a problem. This correction value varies depending on the temperature, or the drive timing or setting (power source setting) of the photoelectric conversion element. For this reason, this embodiment acquires the correction value regularly.

FIG. 13B shows the result of A/D conversion illustrated in FIGS. 11A to 11D and FIGS. 12A to 12D. The slope ratios α1 and α2 and the offsets β1 and β2 can be obtained from the coordinates of eight points (D1, D2, D3, D4, D5, D6, D7, and D8) illustrated in FIG. 13B.

For example, the slope ratio α is given by the following equations.

$$\alpha 1 = (D5-D1)/(D7-D3)$$

$$\alpha 2 = (D6-D2)/(D8-D4)$$

After the slope ratio α is given, the offset β1 is determined so that two straight lines corresponding to the reference signal L1 and the reference signal H1 can take the same value at the threshold voltage VREF. Furthermore, the offset β2 is determined so that two straight lines corresponding to the reference signal L2 and the reference signal H2 can take the same value at the threshold voltage VREF. The threshold voltage VREF for use in the A/D conversion of the S signal of the effective pixel is greater than the fixed voltages V1 and V2. This is illustrative only. The threshold voltage VREF for use in the A/D conversion of the S signal of the effective pixel can be freely set.

The above calculation may be performed in the photoelectric conversion apparatus 1 or with an image processing large-scale integrated circuit (LSI) outside the photoelectric conversion apparatus 1. The above calculation may be performed, for example, before the photoelectric conversion apparatus 1 is installed in a photoelectric conversion system, and correction data may be stored in a memory of the photoelectric conversion system. Performing the calculation earlier than a photoelectric conversion operation allows correction after obtaining correction data incorporating the influence of temperature and other environmental conditions, which provides preferable photoelectric conversion signals suitable for the environmental conditions.

Sixth Embodiment

Figure 14A:
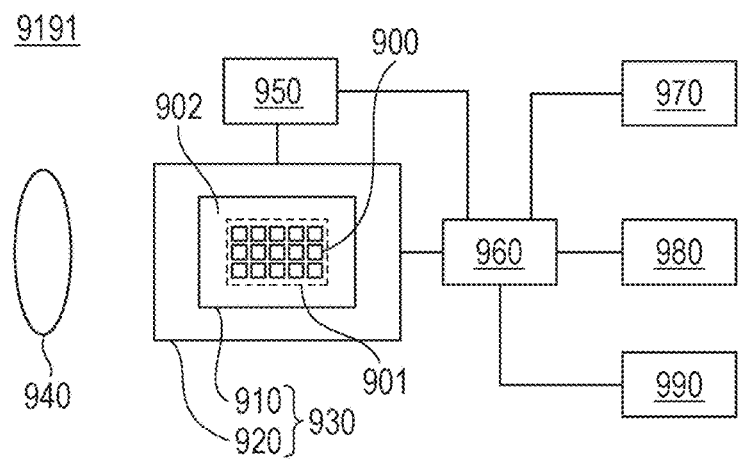
FIGS. 14A to 14C are schematic diagrams illustrating equipment according to a sixth embodiment.

A sixth embodiment is applicable to any of the first to fifth embodiments. FIG. 14A is a schematic diagram illustrating equipment 9191 including a semiconductor apparatus 930 of this embodiment. The semiconductor apparatus 930 may be any of the photoelectric conversion apparatuses (image capturing apparatuses) of the above embodiments. The equipment 9191 including the semiconductor apparatus 930 will be described in detail hereinbelow. The semiconductor apparatus 930 can include a semiconductor device 910. The semiconductor device 910 includes a pixel area 901 in which pixel circuits 900 including a photoelectric converter are arrayed in rows and columns. The semiconductor device 910 can include a peripheral area 902 around the pixel area 901. The peripheral area 902 can include a circuit other than the pixel circuits 900. The semiconductor apparatus 930 can include a package 920 that houses the semiconductor device 910, in addition to the semiconductor device 910. The package 920 can include a base to which the semiconductor device 910 is fixed and a cover, such as glass, facing the semiconductor device 910. The package 920 can further include a joint, such as a bonding wire or bump, that connects a terminal of the base and a terminal of the semiconductor device 910.

The equipment 9191 can include at least any of an optical device 940, a controller 950, a processor 960, a display 970, a storage 980, and a mechanical device 990. The optical device 940 is provided for the semiconductor apparatus 930. Examples of the optical device 940 include a lens, a shutter, and a mirror and include an optical system that guides light to the semiconductor apparatus 930. The controller 950 controls the semiconductor apparatus 930. One example of the controller 950 is a semiconductor apparatus, such as an application specific integrated circuit (ASIC).

The processor 960 processes signals output from the semiconductor apparatus 930. Examples of the processor 960 include a central processing unit (CPU), an ASIC, and other semiconductor apparatuses constituting an analog front-end (AFE) or a digital front-end (DFE). Examples of the display 970 include an electroluminescence (EL) display and a liquid crystal display that display information (images) obtained by the semiconductor apparatus 930. Examples of the storage 980 include a magnetic device and a semiconductor device that store information (images) obtained by the semiconductor apparatus 930. Examples of the storage 980 include volatile memories, such as a static random access memory (SRAM) and a dynamic random access memory (DRAM), and non-volatile memories, such as a flash memory and a hard disk drive.

The mechanical device 990 includes a movable part or a driving part, such as a motor or an engine. The equipment 9191 displays signals output from the semiconductor apparatus 930 on the display 970 or transmits the signals externally using a communication apparatus (not shown) of the equipment 9191. For this purpose, the equipment 9191 may further include the storage 980 and the processor 960, in addition to the memory circuit and the arithmetic circuit of the semiconductor apparatus 930. The mechanical device 990 may be controlled based on a signal output from the semiconductor apparatus 930.

The equipment 9191 is applicable to information terminals having a photographing function (for example, a smartphone and a wearable terminal), cameras (for example, a camera with interchangeable lenses, a compact camera, a video camera, and a monitoring cameras), or other electronic equipment. The mechanical device 990 in a camera can drive the components of the optical device 940 for zooming, focusing, and shutter operations. The mechanical device 990 in a camera can move the semiconductor apparatus 930 for image stabilization.

Other examples of the equipment 9191 include transport equipment, such as vehicles, marine vessels, and flight vehicles (for example, drones and aircrafts). The mechanical device 990 in the transport equipment can be used as a moving apparatus. The equipment 9191 serving as transport equipment is suitable for transporting the semiconductor apparatus 930 or assisting and/or automating the driving using a photographing function. The processor 960 for assisting and/or automating driving (controlling) can perform processing for operating the mechanical device 990 serving as a moving apparatus based on information obtained by the semiconductor apparatus 930. Other examples of the equipment 9191 include medical equipment, such as endoscopes, measurement equipment, such as range sensors, analytical equipment, such as electron microscopes, business equipment, such as copying machines, and industrial equipment, such as robots.

The above embodiments can provide desired pixel characteristics. This can increase the value of semiconductor apparatuses. Improving the value here includes at least any of adding functions, improving the performance, improving the characteristics, improving the reliability, increasing the fabrication yield, reducing the environmental load, reducing the cost, and reducing the size and weight.

Accordingly, using the semiconductor apparatus 930 according to this embodiment for the equipment 9191 can increase the value of the equipment 930. For example, installing the semiconductor apparatus 930 in transportation equipment gives superior performance in photographing the outside of the transportation equipment or measuring outside environment. Thus, installing the semiconductor apparatus according to this embodiment in transportation equipment when manufacturing and selling transportation equipment is advantageous in enhancing the performance of the transportation equipment itself. The semiconductor apparatus 930 is particularly suitable for transportation equipment that assists driving and/or performs automated driving of the transportation equipment using information obtained by a semiconductor apparatus.

A photoelectric conversion system and a movable object of this embodiment will be described with reference to FIGS. 14B and 14C.

Figure 14B:
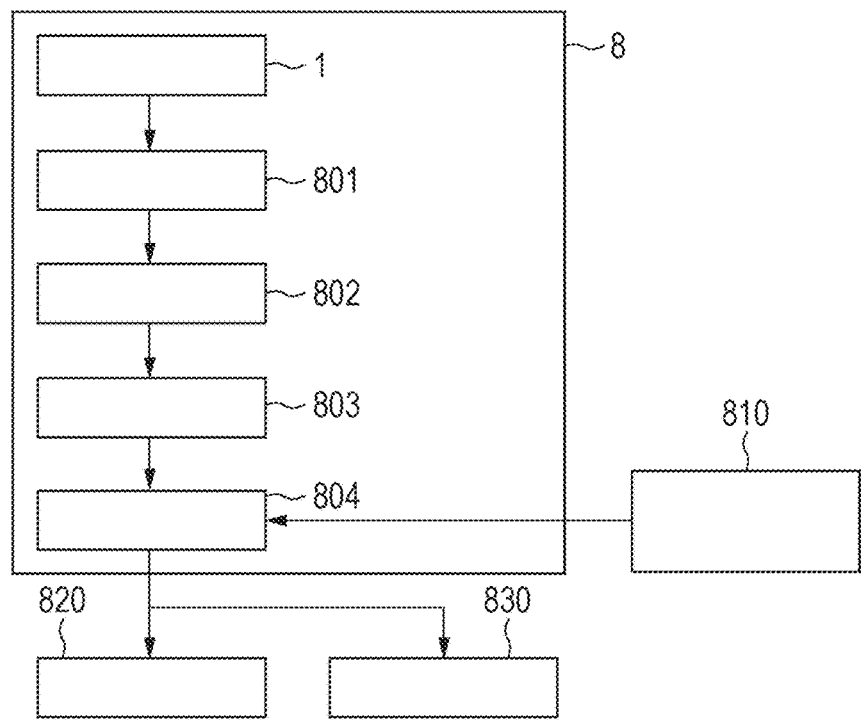

FIG. 14B illustrates an example of a photoelectric conversion system for car-mounted cameras. A photoelectric conversion system 8 includes the photoelectric conversion apparatus 1. The photoelectric conversion apparatus 1 is the photoelectric conversion apparatus (image capturing apparatus) according to one of the above embodiments. The photoelectric conversion system 8 includes an image processing unit 801 that performs image processing on multiple image data obtained by the photoelectric conversion apparatus 1 and a parallax acquisition unit 802 that calculates parallax (the phase difference between parallax images) from the multiple image data obtained by the photoelectric conversion system 8. The photoelectric conversion system 8 may include an optical system (not shown), for example, a lens, a shutter, and a mirror, that guides light to the photoelectric conversion apparatus 1. The pixels of the photoelectric conversion apparatus 1 may include multiple photoelectric converters that are substantially conjugate to the pupil of the optical system. For example, the multiple photoelectric converters that are substantially conjugate to the pupil are disposed for each microlens. The multiple photoelectric converters receive light that has passed through different positions of the pupil of the optical system, so that the photoelectric conversion apparatus 1 outputs image data corresponding to the light that has passed through the different positions. The parallax may be calculated by the parallax acquisition unit 802 using the output image data. The photoelectric conversion system 8 further includes a distance acquisition unit 803 that calculates the distance to the object based on the calculated parallax and a collision determination unit 804 that determines whether collision can occur based on the calculated distance. The parallax acquisition unit 802 and the distance acquisition unit 803 are examples of a distance-information acquisition unit that obtains information on the distance to the object. In other words, the distance information is information about the parallax, the defocusing amount, the distance to the object, and so on. The collision determination unit 804 may determine whether collision can occur using any of the distance information. The distance information may be obtained by Time of Flight (ToF). The distance-information acquisition unit may be implemented by either specifically designed hardware or a software module. Alternatively, the distance-information acquisition unit may be implemented by a field programmable gate array (FPGA), an ASIC, or a combination thereof.

The photoelectric conversion system 8 is connected to a vehicle-information acquisition unit 810, thereby obtaining vehicle information such as vehicle speed, yaw rate, and steering angle. The photoelectric conversion system 8 is also connected to an electronic control unit (ECU) 820, which outputs a control signal for generating a braking force for the vehicle in response to the determination result of the collision determination unit 804. The photoelectric conversion system 8 is also connected to a warning device 830 that warns the driver in response to the determination result of the collision determination unit 804. For example, if there is a high collision possibility as a result of the determination of the collision determination unit 804, the ECU 820 performs vehicle control to avoid the collision or reduce damage by applying a brake, returning the accelerator, or decreasing the engine output. The warning device 830 warns the user, for example, gives a sound warning, displays warning information on the screen of a car navigation system or the like, or vibrates the seat belt or the steering.

In this embodiment, images of the area around the vehicle, for example, in front or rear, are captured by the photoelectric conversion system 8.

Figure 14C:
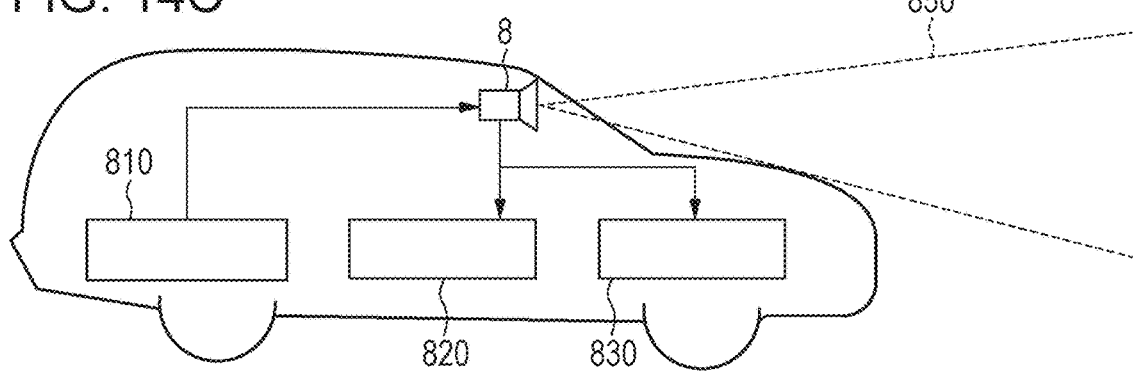

FIG. 14C illustrates the photoelectric conversion system 8 when capturing an image in front of the vehicle (an imaging area 850). The vehicle-information acquisition unit 810 issues instructions to the photoelectric conversion system 8, or the photoelectric conversion apparatus 1. This configuration increases the accuracy of ranging.

While the above example describes control for avoiding collision with another vehicle, other embodiments of the present disclosure are also applicable to control for autonomous driving following another vehicle and control for autonomous driving that prevents deviation from lanes. The photoelectric conversion system 8 is applicable not only to vehicles, such as automobiles, but also to movable objects (movable apparatus), such as marine vessels, aircrafts, and industrial robots. In addition, the photoelectric conversion system 8 is extensively applicable not only to movable objects but also to equipment that uses object recognition, such as an integrated transport system (ITS).

In this specification, the expressions, "A or B", "at least one of A and B", "at least one of A or/and B", and "one or more of A and/or B" can include all possible combinations of enumerated items unless otherwise explicitly defined. In other words, it is to be understood that the above expressions include all of a case where at least one A is included, a case where at least one B is included, and a case where both of at least one A and at least one B are included. This also applies to a combination of three or more components.

The above embodiments can be modified as appropriate without departing from the technical spirit and scope of the invention. The disclosure in this specification encompasses not only what is described in this specification but also all matters discernible from this specification and the drawings attached to this specification. The disclosure in this specification includes a complement set of concepts described in this specification. In other words, if there is a statement in this specification, for example, "A is larger than B", this specification discloses that "A is not larger than B" even if the description "A is not larger than B" is omitted. This is because the description "A is larger than B" is based on the premise that the case of "A is not larger than B" is taken into account.

According to various embodiments of the present disclosure, noise can be reduced in A/D conversion using ramp signals having different slopes.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-106780 filed Jun. 29, 2023, which is hereby incorporated by reference herein in its entirety.

What is claimed is:

1. A signal processing method for analog-to-digital (A/D) conversion for converting analog signals to digital signals of different bit numbers using a sloped ramp signal, the method comprising:

first A/D conversion that performs at least one of an operation for converting an analog signal to a digital signal of a first bit number using a first ramp signal with a first slope or an operation for converting the analog signal to the digital signal of the first bit number using a second ramp signal with a second slope larger than the first slope; and second A/D conversion that performs at least one of an operation for converting an analog signal to a digital signal of a second bit number smaller than the first bit number using a third ramp signal with a third slope or an operation for converting the analog signal to the digital signal of the second bit number using a fourth ramp signal with a fourth slope larger than the third slope, wherein a ratio of the second slope to the first slope is lower than a ratio of the fourth slope to the third slope.

2. The signal processing method according to claim 1, wherein the first A/D conversion is performed using the first ramp signal or the second ramp signal, and the second A/D conversion is performed using the third ramp signal or the fourth ramp signal.

3. The signal processing method according to claim 2,
wherein one of the first ramp signal and the second ramp signal is selected for use in the first A/D conversion based on a result of comparison between the analog signal and a first threshold voltage, and
wherein one of the third ramp signal and the fourth ramp signal is selected for use in the second A/D conversion based on a result of comparison between the analog signal and a second threshold voltage with a value different from the first threshold voltage.

4. The signal processing method according to claim 3, wherein a signal amplitude of the second threshold voltage is smaller than a signal amplitude of the first threshold voltage.

5. The signal processing method according to claim 1, wherein a ratio of a bit depth of the first A/D conversion to a bit depth of the second A/D conversion is substantially equal to a ratio of the fourth slope to the second slope.

6. The signal processing method according to claim 1,
wherein third A/D conversion is performed before the first A/D conversion and the second A/D conversion,
wherein the first A/D conversion and the second A/D conversion are performed using, as the analog signal, a photoelectric conversion signal output from a pixel including a photoelectric converter that generates an electric charge by photoelectric conversion, the photoelectric conversion signal being based on the electric charge, and
wherein the third A/D conversion is performed using, as the analog signal, a reset-level signal output from the pixel.

7. The signal processing method according to claim 6, wherein the third A/D conversion is performed using a ramp signal selected from a plurality of ramp signals with different slopes.

8. The signal processing method according to claim 7, wherein either an operation using the first ramp signal and the second ramp signal for use in the third A/D conversion or an operation using the third ramp signal and the fourth ramp signal for use in the third A/D conversion is performed.

9. The signal processing method according to claim 7, wherein the third A/D conversion is performed in such a manner that, after A/D conversion using one of the plurality of ramp signals is completed, A/D conversion using another of the plurality of ramp signals starts.

10. The signal processing method according to claim 7, wherein the third A/D conversion is performed in such a manner that at least part of an A/D conversion period using one of the plurality of ramp signals overlaps with at least part of an A/D conversion period using another of the plurality of ramp signals.

11. The signal processing method according to claim 1,
wherein the first A/D conversion is performed in such a manner that, after A/D conversion using the first ramp signal is completed, A/D conversion using the second ramp signal starts, and
wherein the second A/D conversion is performed in such a manner that, after A/D conversion using the third ramp signal is completed, A/D conversion using the fourth ramp signal starts.

12. The signal processing method according to claim 1,
wherein the first A/D conversion is performed in such a manner that at least part of an A/D conversion period using the first ramp signal overlaps with at least part of an A/D conversion period using the second ramp signal, and
wherein the second A/D conversion is performed in such a manner that at least part of an A/D conversion period using the third ramp signal overlaps with at least part of an A/D conversion period using the fourth ramp signal.

13. The signal processing method according to claim 1, comprising:
a first mode in which the second A/D conversion is not performed between a plurality of the first A/D conversion periods; and
a second mode in which the first A/D conversion is not performed between a plurality of the second A/D conversion periods.

14. The signal processing method according to claim 13, wherein the first mode includes obtaining the digital signal to be used for a still image, and the second mode includes obtaining the digital signal to be used for a moving image.

15. The signal processing method according to claim 1, wherein operations for acquiring correction values for use in the first A/D conversion and the second A/D conversion are performed in the same frame.

16. The signal processing method according to claim 1, wherein a ratio of a bit depth of the first A/D conversion to a bit depth of the second A/D conversion is lower than a ratio of the fourth slope to the third slope.

17. The signal processing method according to claim 1, wherein the slope is a voltage change of the ramp signal per unit time.

18. A signal processing circuit comprising:
an A/D conversion circuit configured to perform analog-to-digital conversion for converting analog signals to digital signals of different bit numbers using a sloped ramp signal; and
a controller configured to control the A/D conversion circuit,
wherein the controller controls the A/D conversion circuit such that the A/D conversion circuit performs first A/D conversion for converting an analog signal to a digital signal of a first bit number and second A/D conversion for converting an analog signal to a digital signal of a second bit number smaller than the first bit number,
wherein the controller controls the A/D conversion circuit such that the A/D conversion circuit performs at least one of the first A/D conversion for converting the analog signal to the digital signal of the first bit number using a first ramp signal with a first slope or the first A/D conversion for converting the analog signal to the digital signal of the first bit number using a second ramp signal with a second slope larger than the first slope;
wherein the controller controls the A/D conversion circuit such that the A/D conversion circuit performs at least one of the second A/D conversion for converting the analog signal to the digital signal of the second bit number using a third ramp signal with a third slope or the second A/D conversion for converting the analog signal to the digital signal of the second bit number using a fourth ramp signal with a fourth slope larger than the third slope, and
wherein a ratio of the second slope to the first slope is lower than a ratio of the fourth slope to the third slope.

19. The signal processing circuit according to claim 18, further comprising a signal line provided for pixels of one column of a plurality of pixels allayed in rows and columns, wherein the A/D conversion circuit includes a plurality of comparators connected to the one signal line.

20. A photoelectric conversion apparatus comprising:
the signal processing circuit according to claim 18; and
a pixel including a photoelectric converter configured to generate electric charge by photoelectric conversion,
wherein the pixel outputs a photoelectric conversion signal based on the electric charge, and
wherein the A/D conversion circuit converts the photoelectric conversion signal, as the analog signal, to the digital signal by the first A/D conversion or the second A/D conversion.

21. Equipment comprising:
a photoelectric conversion apparatus including the signal processing circuit according to claim 18 and a pixel including a photoelectric converter configured to generate electric charge by photoelectric conversion, wherein the pixel outputs, as the analog signal, a photoelectric conversion signal based on the electric charge to the signal processing circuit, the equipment comprising at least one of:
an optical device configured to guide light to the photoelectric conversion apparatus;
a controller configured to control the photoelectric conversion apparatus;
a processor configured to process a signal output from the photoelectric conversion apparatus;
a display configured to display information obtained by the photoelectric conversion apparatus;
a storage configured to store the information obtained by the photoelectric conversion apparatus; or
a mechanical device configured to operate based on the information obtained by the photoelectric conversion apparatus.

* * * * *